US012652547B2

(12) United States Patent
Tanaka et al.

(10) Patent No.: US 12,652,547 B2
(45) Date of Patent: Jun. 9, 2026

(54) WIRELESS COMMUNICATION DEVICE AND METHOD FOR COHERENT JOINT TRANSMISSION USING IDENTIFICATION INFORMATION IN DATA FRAMES

(71) Applicant: SONY GROUP CORPORATION, Tokyo (JP)

(72) Inventors: Ken Tanaka, Tokyo (JP); Mitsuki Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 219 days.

(21) Appl. No.: 18/551,670

(22) PCT Filed: Jan. 24, 2022

(86) PCT No.: PCT/JP2022/002396
§ 371 (c)(1),
(2) Date: Sep. 21, 2023

(87) PCT Pub. No.: WO2022/209213
PCT Pub. Date: Oct. 6, 2022

(65) Prior Publication Data
US 2024/0171993 A1 May 23, 2024

(30) Foreign Application Priority Data

Mar. 30, 2021 (JP) ................................. 2021-056576

(51) Int. Cl.
H04W 16/26 (2009.01)
H04W 16/28 (2009.01)
H04W 74/0816 (2024.01)
(52) U.S. Cl.
CPC ........... *H04W 16/26* (2013.01); *H04W 16/28* (2013.01); *H04W 74/0816* (2013.01)

(58) Field of Classification Search
CPC . H04W 16/26; H04W 16/28; H04W 74/0816; H04W 84/12; H04B 7/024; H04B 7/0452; H04B 7/0617
See application file for complete search history.

(56) References Cited

U.S. PATENT DOCUMENTS

| 11,564,188 B2* | 1/2023 | Frenger | H04B 7/024 |
| 11,641,633 B1* | 5/2023 | Cao | H04W 56/0045 |
| | | | 370/336 |

(Continued)

FOREIGN PATENT DOCUMENTS

| JP | 2013-506377 A | 2/2013 |
| JP | 2014-509469 A | 4/2014 |

(Continued)

OTHER PUBLICATIONS

"IAB Enhancements for Rel 17", 3rd Generation Partnership Project, AT & T, 3GPP TSG RAN Plenary Meeting #84, RP-192109, Jun. 3-6, 2019, 10 pages.
International Search Report and Written Opinion of PCT Application No. PCT/JP2022/002396, issued on Mar. 15, 2022, 09 pages of ISRWO.

*Primary Examiner* — Ivan O Latorre
(74) *Attorney, Agent, or Firm* — CHIP LAW GROUP

(57) ABSTRACT

The present technology relates to a wireless communication device and method capable of improving an end-to-end communication rate and reliability. The wireless communication device causes a data frame to be sent, the data frame including data and identification information for identifying coherent joint transmission (CJT) by which the data is finally transmitted. The present technology can be applied to a wireless communication system.

17 Claims, 14 Drawing Sheets

(56)          References Cited

U.S. PATENT DOCUMENTS

| | | | | |
|---|---|---|---|---|
| 2015/0288427 A1* | 10/2015 | Wang | .................... | H04W 72/23 |
| | | | | 370/329 |
| 2015/0334712 A1* | 11/2015 | Maaref | ................... | H04L 1/004 |
| | | | | 370/329 |
| 2020/0195328 A1* | 6/2020 | Wu | ........................ | H04L 5/0048 |
| 2021/0368541 A1* | 11/2021 | Hedayat | ............ | H04W 74/0816 |
| 2022/0039104 A1* | 2/2022 | Yi | ..................... | H04W 72/1273 |
| 2022/0131672 A1* | 4/2022 | Jang | ..................... | H04L 5/0094 |
| 2022/0190880 A1* | 6/2022 | Chitrakar | ............... | H04B 7/024 |
| 2023/0055302 A1* | 2/2023 | Wu | .......................... | H04L 1/16 |
| 2023/0098215 A1* | 3/2023 | Tanaka | ............. | H04W 56/0035 |
| | | | | 370/329 |
| 2023/0141791 A1* | 5/2023 | Tanaka | ................ | H04B 7/0639 |
| | | | | 375/267 |
| 2023/0171050 A1* | 6/2023 | Tanaka | ................ | H04L 5/0035 |
| | | | | 370/328 |
| 2024/0171993 A1* | 5/2024 | Tanaka | ................ | H04B 7/0452 |
| 2025/0007562 A1* | 1/2025 | Puerta | ................... | H04B 7/024 |

FOREIGN PATENT DOCUMENTS

| | | | |
|---|---|---|---|
| JP | 2015-530018 A | 10/2015 |
| JP | 2016-501465 A | 1/2016 |
| JP | 2016-532325 A | 10/2016 |
| WO | 2020/218970 A1 | 10/2020 |

\* cited by examiner

*FIG. 3*

CJT:Coherent Joint Transmission

Relay#3 — a,b

Relay#4 — a,b

Relay#1

Relay#2 a,b a,b

WIRELESS COMMUNICATION DEVICE AND METHOD FOR COHERENT JOINT TRANSMISSION USING IDENTIFICATION INFORMATION IN DATA FRAMES

CROSS REFERENCE TO RELATED APPLICATIONS

This application is a U.S. National Phase of International Patent Application No. PCT/JP2022/002396 filed on Jan. 24, 2022, which claims priority benefit of Japanese Patent Application No. JP 2021-056576 filed in the Japan Patent Office on Mar. 30, 2021. Each of the above-referenced applications is hereby incorporated herein by reference in its entirety.

TECHNICAL FIELD

The present technology relates to a wireless communication device and method, and particularly relates to a wireless communication device and method capable of improving an end-to-end communication rate and reliability.

BACKGROUND ART

In a wireless LAN, a relay transmission scheme in which a plurality of base stations (access points (hereinafter referred to as APs)) performs transmission in cooperation to expand coverage and improve communication quality has attracted attention. Until now, the relay transmission scheme has been standardized in IEEE 802.11s.

In contrast, in IEEE 802.11 Task Group (TG) be, which is a standardization group of a next-generation wireless LAN, Coherent Joint Transmission (CJT) in which a plurality of APs virtually operates as one AP has been discussed. CJT in CoMP assuming a cellular network has also been discussed (see Patent Document 1).

Unlike the coordination scheme defined so far, CJT can be realized by realizing ultra-high-accuracy synchronization.

CITATION LIST

Patent Document

Patent Document 1: Japanese Patent Application National Publication (Laid-Open) No. 2014-509469

SUMMARY OF THE INVENTION

Problems to be Solved by the Invention

Here, in a relay network using a plurality of APs, an AP that receives data from an AP and sends the data to an AP is referred to as a relay station, and an AP that receives data from an AP and sends the data to an STA is referred to as a relay terminal station.

However, in the IEEE 802.11 TG be described above, CJT in a relay network in which CJT is performed in a plurality of relay terminal stations of such a relay network is not discussed.

The present technology has been made in view of such a situation, and an object thereof is to improve an end-to-end communication rate and reliability.

Solutions to Problems

A wireless communication device according to a first aspect of the present technology includes a communication control unit that causes a data frame to be sent, the data frame including data and identification information for identifying coherent joint transmission (CJT) by which the data is finally transmitted.

A wireless communication device according to a second aspect of the present technology includes a reception unit that receives a frame including data and identification information for identifying coherent joint transmission (CJT) by which the data is finally sent, and a decoding unit that decodes the data on the basis of the identification information.

In the first aspect of the present technology, a data frame is sent, the data frame including data and identification information for identifying coherent joint transmission (CJT) by which the data is finally transmitted.

In the second aspect of the present technology, a frame is received, the frame including data and identification information for identifying coherent joint transmission (CJT) by which the data is finally sent, and the data is decoded on the basis of the identification information.

BRIEF DESCRIPTION OF DRAWINGS

FIG. 3 is a diagram illustrating an outline of CJT.

FIG. 14 is a block diagram illustrating a configuration example of a computer.

MODE FOR CARRYING OUT THE INVENTION

Figure 1:
FIG. 1 is a view illustrating an example of a multihop network that performs CJT.

Hereinafter, modes for carrying out the present technology will be described. The description will be given in the following order.

1. Prior art
2. Embodiment
3. Others

1. Prior Art

In an unlicensed band in a wireless local area network (LAN), in a basic service set (BSS), a base station (access point (hereinafter referred to as an AP)) and a user terminal (hereinafter referred to as an STA) autonomously obtain right to send in the BSS and perform communication.

In recent years, in high-definition video transmission such as augmented reality (AR), virtual reality (VR), 4K, or 8K, the amount of data handled is very large. Therefore, it is necessary to ensure high communication quality in an arbitrary place, and a multihop network (alternatively, a relay network or relay transmission) has attracted attention, and IEEE 802.11s and the like have been standardized.

Furthermore, in addition to the relay network, coordinated transmission between a plurality of base stations (Coordinated Multi-point (CoMP)) transmission is standardized in the third generation partnership project (3GPP) as a transmission scheme for securing high communication quality. CoMP has several transmission schemes, and among them, coherent joint transmission (CJT) is known as a transmission scheme for achieving the highest peak rate in an ideal environment.

CJT is a transmission scheme in which a plurality of base stations operates as "one virtual base station", and it is possible to form a beam with a higher gain and achieve high communication quality in order to improve transmission power and a degree of freedom of a transmission antenna in essence. However, in order for a plurality of base stations to operate as "one virtual base station", the following two points are required: (1) high-precision synchronization of transmission timing and frequency between the base stations, and (2) matching of data to be sent between the base stations.

Note that, as will be described later, in a transmission scheme called non-CJT (NCJT), a plurality of base stations forms beams independently, and spatial separation processing (or spatial filtering) is performed in a receiving device. Compared with CJT, NCJT has an advantage that required synchronization accuracy is low, but has a disadvantage that spatial degree of freedom cannot be obtained for all transmission antennas between coordinated base stations.

In a wireless LAN, the accuracy of the oscillation frequency imposed on a wireless communication device is in the range of ±20 ppm in the 5 GHz and 6 GHz bands and ±25 ppm in the 2.4 GHz band, and frequency synchronization is performed between communication devices by using a known sequence (long training field (LTF)) in a reference signal.

In order to perform CJT, frequency synchronization of about 10 Hz is required; however, the frequency synchronization accuracy using the known sequence described above is about 350 Hz. However, Cited Document 1 (Ron Porat, Srinath Puducheri, "Joint Processing MU-MIMO", "doc.: IEEE 802.11-19/0094r0, https://mentor.ieee.org/802.11/dcn/19/11-19-0094-00-0eht-joint-processing-mu-mimo.pptx, Jan. 14, 2019<searched on the Internet on Mar. 18, 2021>) proposes a technology in which frequency synchronization of about 10 Hz, which provides higher accuracy between devices, is implemented by a unique algorithm. Therefore, in the IEEE 802.11 TG be, a CJT implementation technique is also discussed in a wireless LAN.

CJT is characterized by a high peak rate for one STA; however, it should be noted that since the degree of freedom of all the transmission antennas between a plurality of base stations can be used, the number of simultaneous multiplex transmissions increases, and frequency utilization efficiency and a system throughput are improved.

<Multihop Network that Performs CJT>

FIG. 1 is a view illustrating an example of a multihop network that performs CJT.

In FIG. 1, one source station (hereinafter, also referred to as a Source), four relay stations (hereinafter, also referred to as Relays, and N STAs are illustrated.

The Source is an AP that holds data to be transmitted to each STA by connection to a wired network or the like. Each of Relays #1 to #4 is an AP that transmits data transmitted from the Source to one of the Relays #1 to #4 other than itself or to the STA.

In the case of FIG. 1, data is simultaneously transmitted from the Source to the Relay #1 and the Relay #2. Then, the data is transmitted from the Relay #1 and the Relay #2 to the Relay #3 and the Relay #4, and finally, the data is transmitted to each STA by CJT of the Relay #3 and the Relay #4. That is, among the Source and the Relays #1 to #4, the Relay #3 and the Relay #4 are relay terminal stations.

By performing CJT in the Relay #3 and the Relay #4, as described above, high frequency utilization efficiency can be realized in transmission between the Relays #3 and #4 and each STA. However, due to CJT constraints, in the Relay #3 and the Relay #4, data to be transmitted by CJT needs to match.

For this reason, in the multihop network, the following requirements occur;

(A) ensuring a relatively high transmission rate in transmission from the Source to the Relays #3 and #4, and (B) ensuring a relatively high reliability in transmission from the Source to the Relays #3 and #4

Here, in order to satisfy the requirement (A) described above, attention is paid to a transmission scheme between the Relays #1, #2 and the Relays #3, #4. Although some transmission schemes between the Relays #1, #2 to the Relays #3, #4 are assumed, two representative transmission schemes, that is, Null steering and CJT are indicated below from the viewpoint of improving frequency utilization efficiency.

<Outline of Null Steering>

Figure 2:
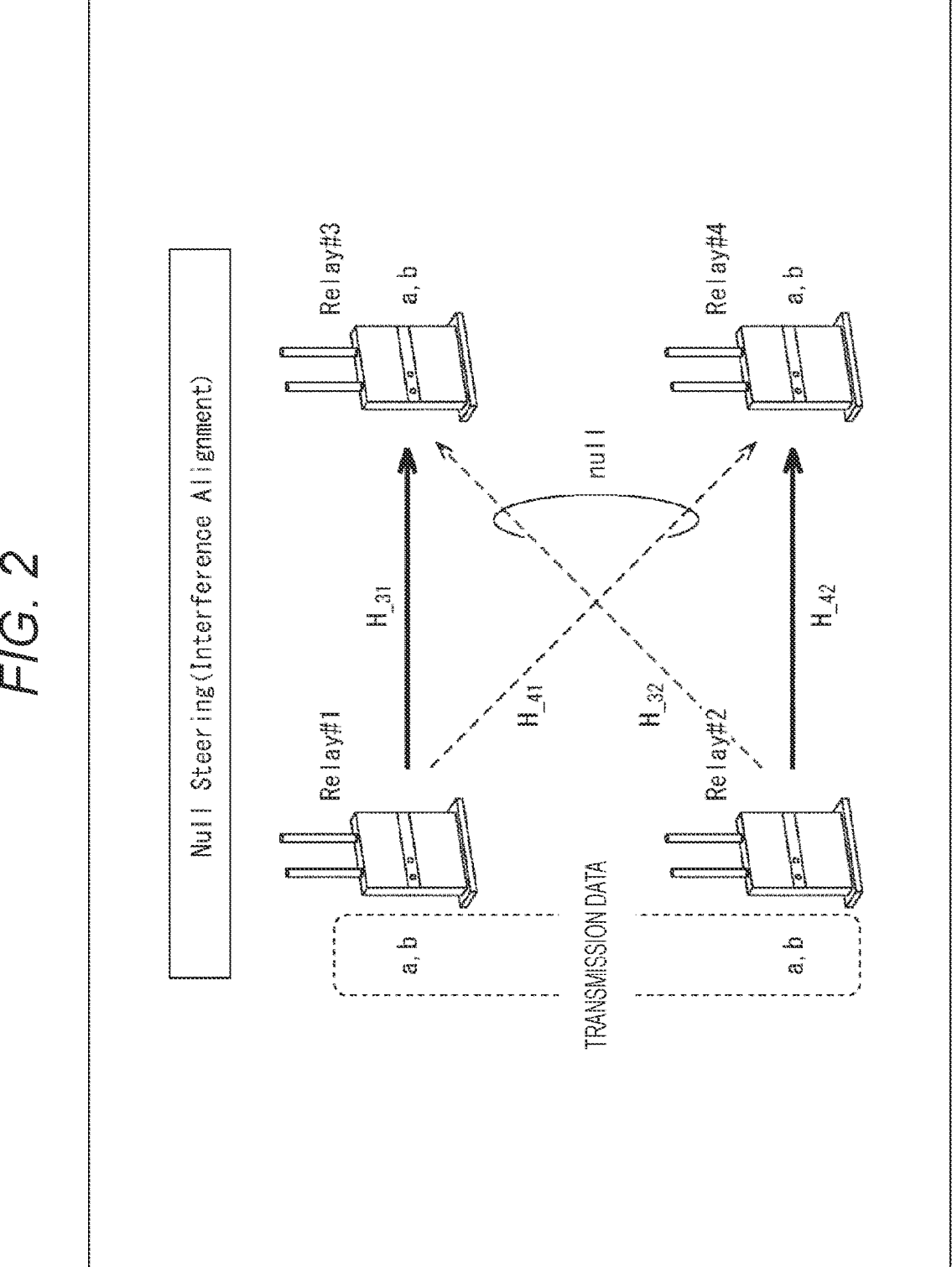
FIG. 2 is a diagram illustrating an outline of Null Steering.

FIG. 2 is a diagram illustrating an outline of Null Steering.

FIG. 2 illustrates a case where the channel between a Relay #i and a Relay #j is H_ji, and two pieces of data a and b are transmitted to the Relay #3 and the Relay #4. Note that i and j represent any integers among 1, 2, 3, and 4. The same applies to the following diagrams.

Null Steering is a technique in which one relay station performs transmission to one relay station, and a null is formed by directivity control with respect to a destination device or a sending source device transmission to or from which is not desired. In this manner, by suppressing a signal from a sending source device transmission from which is not desired and a signal to a destination device transmission to which is not desired, an interference signal level with respect to a received signal can be suppressed.

FIG. 2 illustrates an example in which the Relay #1 performs transmission to the Relay #3, and the Relay #2 performs transmission to the Relay #4. At this time, the Relay #1 forms a null for H_41, and the Relay #2 forms a null for H_32.

Therefore, each of the Relay #3 and the Relay #4 can receive signals only from a desired sending source device without receiving interference signals. However, since the Relay #3 and the Relay #4 finally perform CJT, the Relay #1 and the Relay #2 need to transmit the same data (in the diagram, a and b) to the Relay #3 and the Relay #4, respectively.

Note that interference alignment is known as a scheme in which a null is not formed in the Relay #1 and the Relay #2 that are sending devices, and the interference alignment is an extension of a scheme in which a null is formed in the Relay #3 and the Relay #4 that are receiving devices.

<Outline of CJT>

Figure 3:
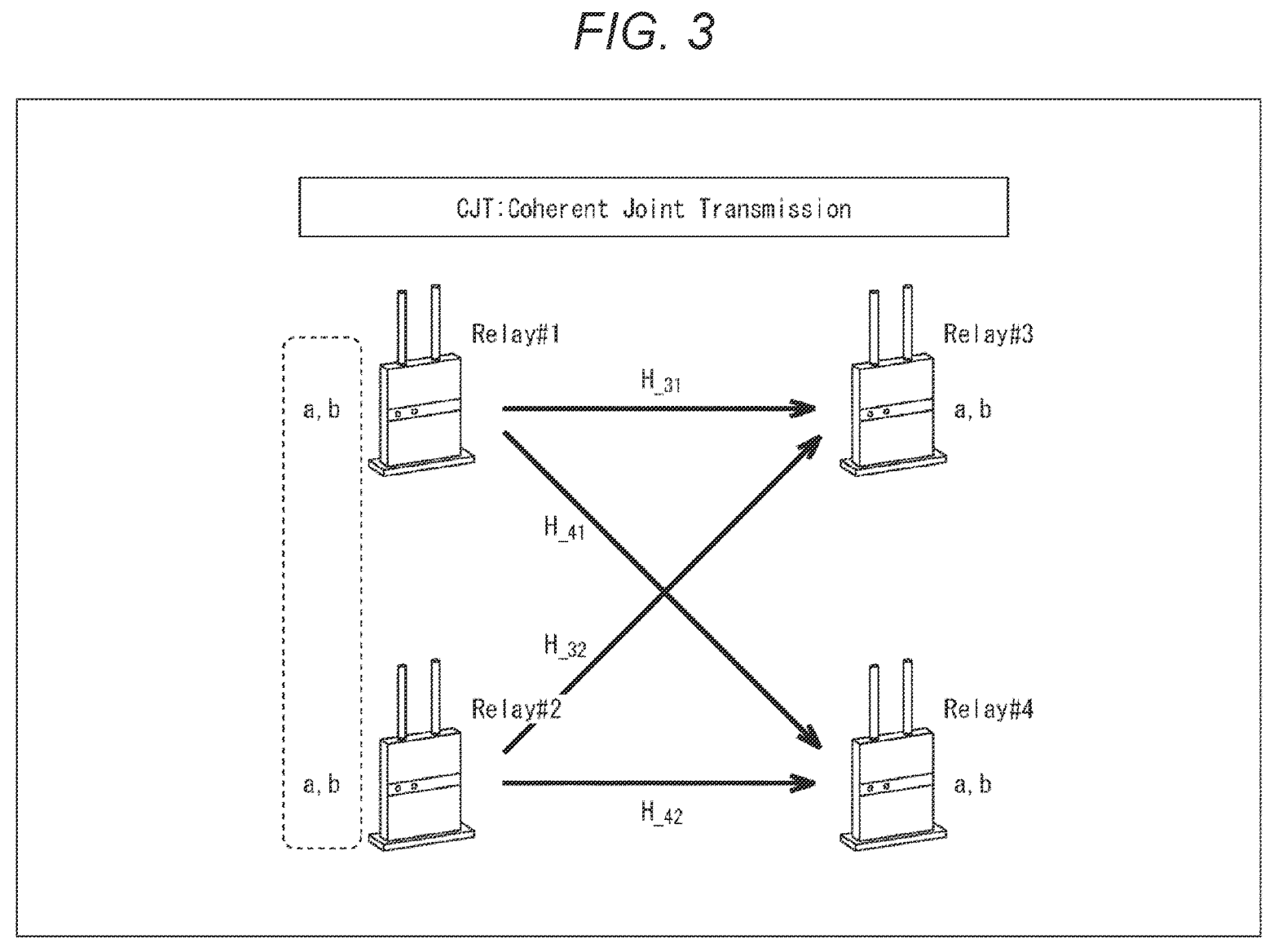

FIG. 3 is a diagram illustrating an outline of CJT.

As described above, CJT is a scheme in which the Relay #1 and the Relay #2 operate as one virtual relay station.

FIG. 3 illustrates an example in which the Relay #1 and the Relay #2 as one virtual relay station transmit data a and b in parallel to the Relay #3 and the Relay #4.

What is different from Null Steering is that a high data rate can be realized but high frequency synchronization accuracy, which is a characteristic of CJT, is required in the case of CJT. Furthermore, what is same as Null Steering is that both the Relay #1 and the Relay #2 need to hold the same data (in the drawing, a and b).

In transmission between the Relays #1, #2 and the Relays #3, #4, in Null Steering and CJT, each of the Relay #1 and the Relay #2 need to transmit the same data, due to a constraint that the Relay #3 and the Relay #4 perform CJT. That is, since it is necessary to send twice the data, a physical (PHY) rate of transmission and a transmission speed with respect to data actually transmitted by CJT by the Relay #3 and the Relay #4 are deviated. That is, in the case of Null Steering and CJT, in a case where it is assumed that the system throughput between the Relays #1, #2 and the Relays #3, #4 is R_1, data transmitted by CJT by the Relays #3 and #4 is not transmitted at a transmission rate R_1 but is transmitted at a transmission rate R_1/2.

In the two schemes of Null Steering and CJT, since the transmission rate is effectively lower than the requirement (A) described above, a sufficiently high system throughput cannot be satisfied in some cases.

Therefore, it is known that a transmission scheme in which multicast multi-user beamforming (hereinafter referred to as MMUBF) and NCJT are combined is effective as a transmission scheme that satisfies the requirement (A) described above.

Note that, in the following, a scheme in which each of a plurality of sending stations performs MMUBF and spatial separation is performed in a receiving device (hereinafter referred to as NCJT/MMUBF) will be considered.

<Outline of NCJT/MMUBF>

Figure 4:
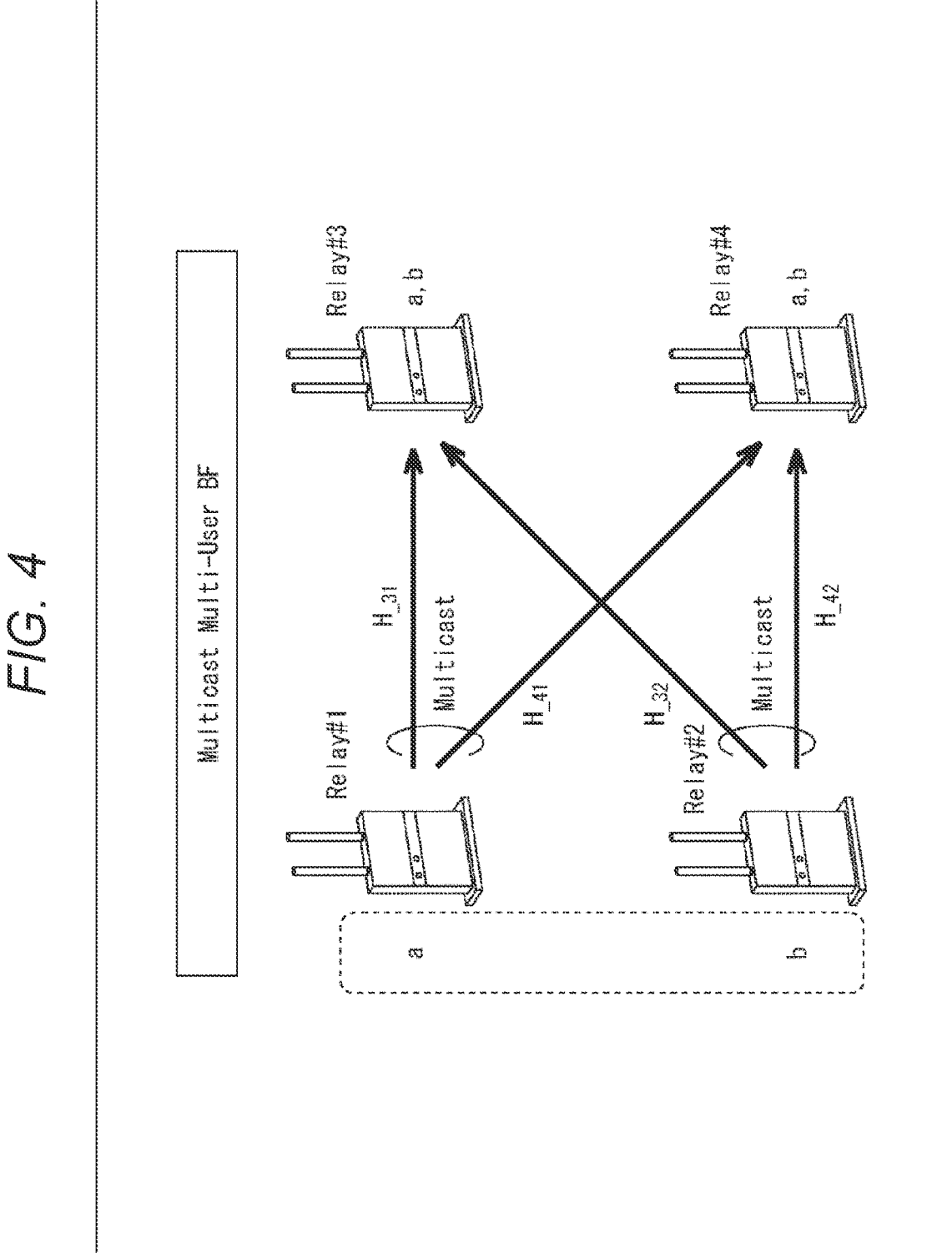
FIG. 4 is a diagram illustrating an outline of NCJT/MMUBF.

FIG. 4 is a diagram illustrating an outline of NCJT/MMUBF.

FIG. 4 illustrates that in NCJT/MMUBF, the Relay #1 and the Relay #2 send data a and b by MMUBF, respectively. A receiving device separates and receives each piece of data (or stream) by spatial separation processing.

Compared with Null Steering and CJT, in NCJT/MMUBF, data sent by each of the Relay #1 and the Relay #2 may not be two pieces of data a and b but one of them. Therefore, unlike Null Steering and CJT in which both the two pieces of data need to be sent, the data a and b can be transmitted to the Relay #3 and the Relay #4 earlier than in Null Steering and CJT.

In contrast, since a sending device sends data to a plurality of destination devices by a common coding scheme (modulation and coding scheme (MCS)), the data cannot be transmitted by a coding scheme suitable for each communication path to the destination device. Therefore, it is difficult to satisfy the requirement (B) described above. Furthermore, here, in NCJT/MMUBF, unlike Null Steering and CJT, the receiving device receives data from a plurality of different paths. Therefore, in order to satisfy the requirement (B) described above, it can be expected that the reliability is efficiently improved by packet redundancy using an erasure code such as a fountain code, or a network code.

Examples of the fountain code include a fountain code described in Cited Document 2 ("IAB Enhancements for Rel 17", AT & T, 3GPP TSG RAN Plenary Meeting #84, RP-192109, Newport Beach, USA, Jun. 3-6, 2019, https://www.3gpp.org/ftp/tsg_ran/TSG_RAN/TSGR_85/Docs/RP-192109.zip <searched on the Internet on Mar. 18, 2020>).

Conventional CoMP (particularly, CJT) has been studied in, for example, a star topology including one centralized control station and a plurality of sending points connected thereto.

However, in a case where CJT is performed by the Relay #3 and the Relay #4 in a multihop network targeted by the present technology, it is necessary to check whether data sent as CJT by the Relay #3 and the Relay #4 is properly received in the Relay #1 and the Relay #2.

In particular, a plurality of CJTs with different destinations is generated in the Relay #3 and the Relay #4 in some cases, and packet redundancy is performed as described above in some cases. In these cases, the following needs to be performed.

(A) Even if there is a plurality of CJTs, data relayed for each CJT performed by the Relay #3 and the Relay #4 is correctly received by the Relay #1 and the Relay #2.

(B) Relay transmission is performed without retransmission in a case where data sent from the Source and sent by CJT in the Relay #3 and the Relay #4 has correction capability due to code redundancy even if error/packet loss occurs in part of the data.

In particular, Cited Document 3 (IEEE 802.11-2016—IEEE STANDARD FOR INFORMATION TECHNOLOGY-PART 11: WIRELESS LAN MEDIUM ACCESS CONTROL (MAC) AND PHYSICAL LAYER (PHY) SPECIFICATIONS, Dec. 7, 2016) does not define information indicating that data is to be transmitted by CJT in 1:1 communication in a wireless LAN.

Furthermore, Patent Document 1 defines information for identifying a sending point that performs CJT in CoMP assuming a cellular network, but does not mention information for identifying CJT to be performed.

Therefore, in the present technology, information for identifying CJT to be performed is sent with respect to data transmitted by CJT.

Therefore, data to be sent by CJT can be accurately and quickly transmitted to the Relay #3 and the Relay #4, and improvement in an end-to-end communication rate and improvement in reliability can be expected in a case where CJT is performed in a multihop network.

Note that in particular, in NCJT/MMUBF, in a case where packet redundancy is performed, a decoding process cannot be performed unless the packets (or data) received at the time of decoding by a receiving device is rearranged in the correct order (reorder control). Cited Document 3 neither discloses this reorder control.

2. Embodiment

Figure 5:
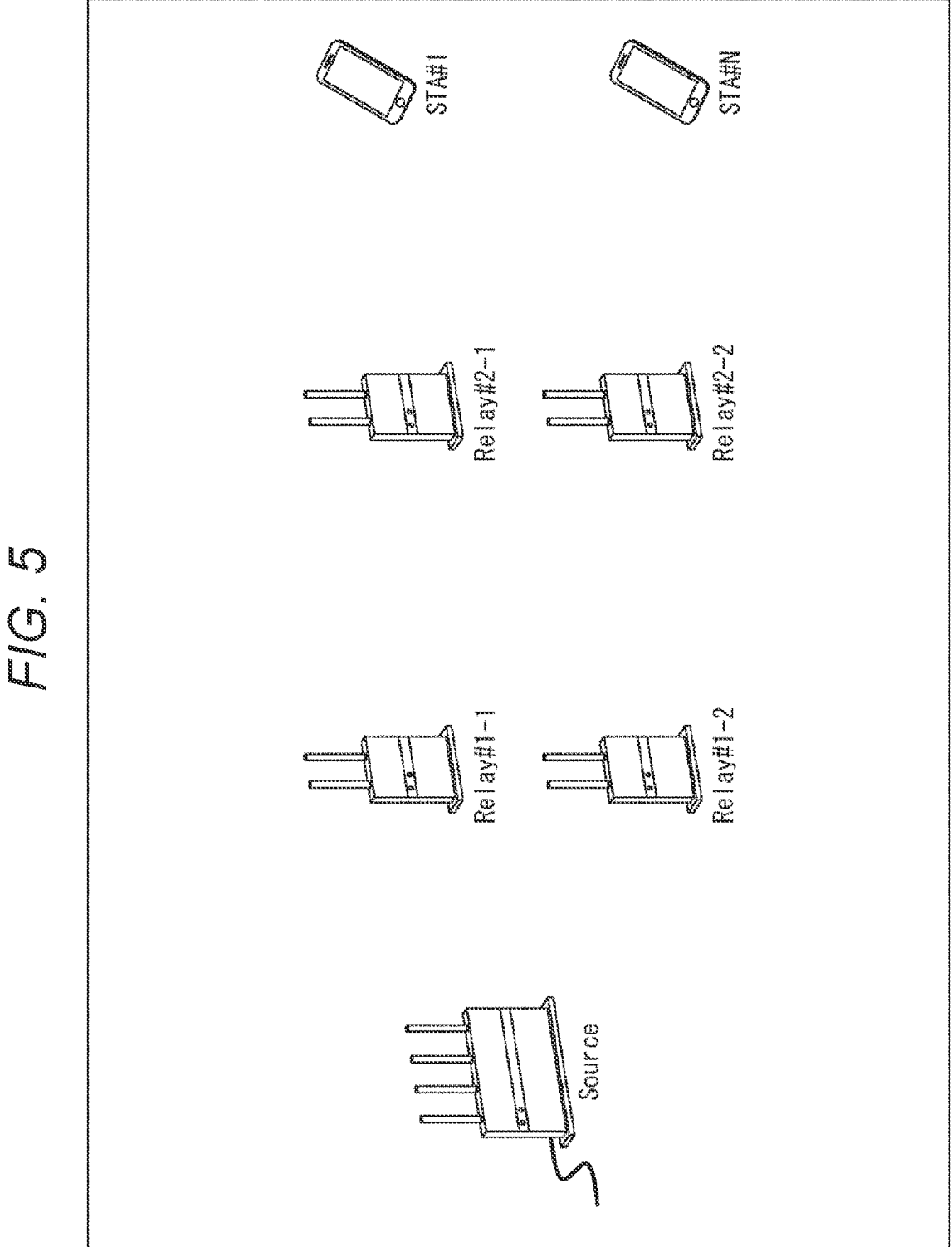
FIG. 5 is a view illustrating an example of an overall configuration of a wireless communication system according to an embodiment of the present technology.

FIG. 5 is a view illustrating a configuration example of a wireless communication system according to an embodiment of the present technology.

The wireless communication system in FIG. 5 is a system including a multihop network. In the multihop network, there are four Relays (relay stations) #1-1, #1-2, #2-1, and #2-2, and N STAs #1 to #N for one Source (source station).

In FIG. 5, the Source is connected to a wide area network (WAN) by wired communication or wireless communication. Furthermore, the Source is connected to at least the Relay #1-1 and the Relay #1-2 by wireless communication.

The Relay #1-1 and the Relay #1-2 are connected to at least the Source, the Relay #2-1, and the Relay #2-2 by wireless communication.

The Relay #2-1 and the Relay #2-2 are connected to at least the Relay #1-1, the Relay #1-2, and the STA by wireless communication.

The STA is connected to at least the Relay #2-1 and the Relay #2-2 by wireless communication.

With respect to arbitrary i and j, Relays #1-*i* and Relays #2-*j* are referred to as a first relay station group and a second relay station group, respectively.

It should be noted that the example of FIG. 1 is an example, and may be generalized as follows.

FIG. 1 illustrates a case where each of the first relay station group and the second relay station group includes two Relays; however, each of the first relay station group and the second relay station group may include three or more Relays. Furthermore, there may be a third relay station group other than the first relay station group and the second relay station group.

With respect to an integer k of 1 or more, the kth relay station group satisfies the following.
In a Case where k=1
A Relay of the kth relay station group is connected to at least the Source, and is connected to at least one (k+1)th relay station group.
In a Case where there is No (k+1)th Relay Station Group
A Relay of the kth relay station group is connected to at least one (k−1)th relay station group and is connected to at least one STA.

Note that the 0th relay station group is the Source. The Source and the Relay are access points (APs). The STA is a user terminal.

Furthermore, a Relay in the kth relay station group connected to an arbitrary STA has a capability and a function capable of performing CJT with another Relay in the kth relay station group.

Moreover, a Relay may belong to a plurality of relay station groups. In this case, assuming that $l_{min} \leq l \leq l_{Max}$ is satisfied for an arbitrary lth relay station group to which the Relay belongs, the lth relay station group may satisfy only some of the conditions of the $l_{min}$th relay station group and the $l_{Max}$th relay station group.
<Configuration Example of Wireless Communication Device>
FIG. 6 is a block diagram illustrating a configuration example of a wireless communication device.

Figure 6:
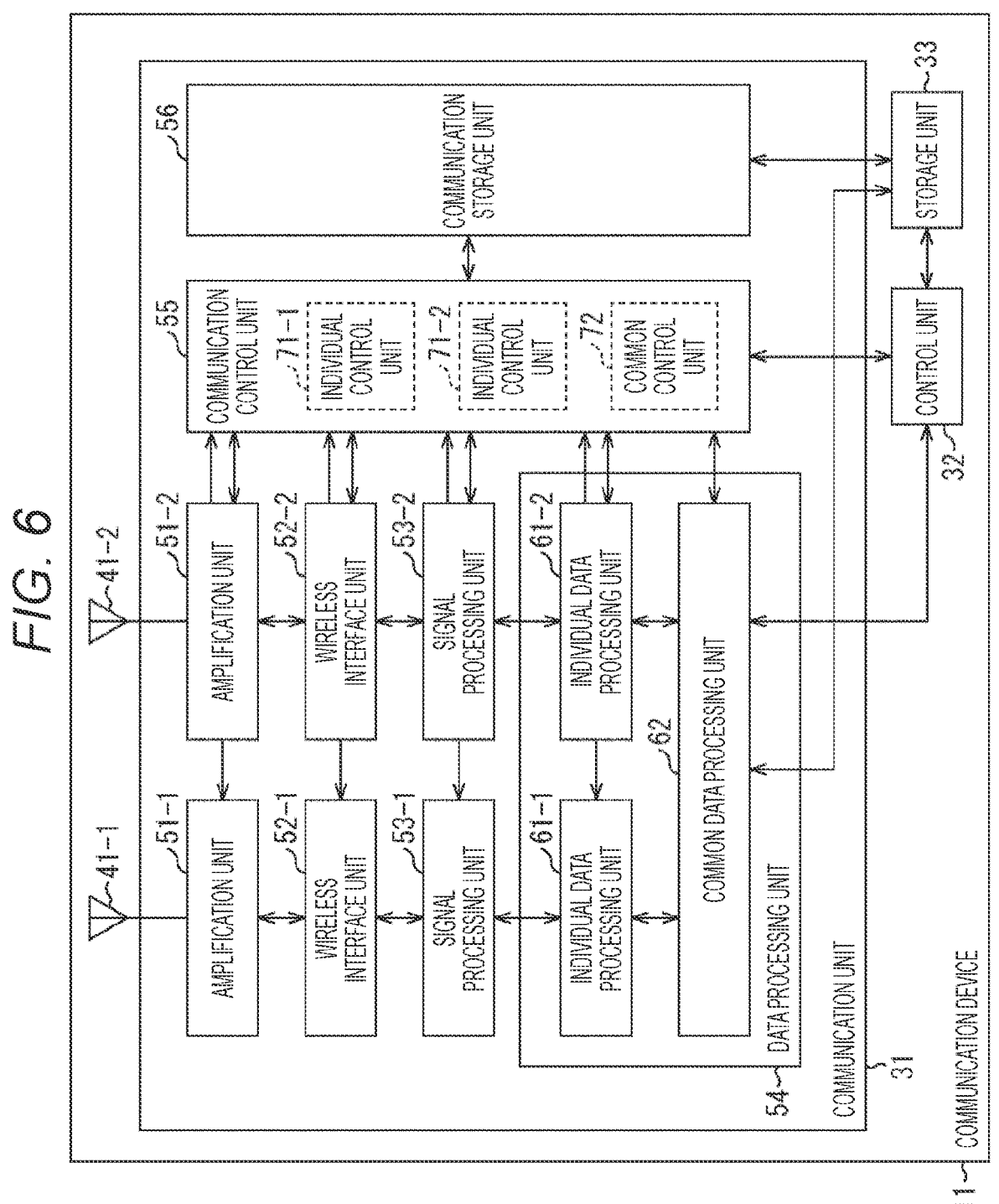
FIG. 6 is a block diagram illustrating a configuration example of a wireless communication device.

The wireless communication device 11 illustrated in FIG. 6 is a wireless communication device that operates as a Source, a Relay, or an STA.

The wireless communication device 11 includes a communication unit 31, a control unit 32, a storage unit 33, and antennas 41-1 and 41-2. The antennas 41-1 and 41-2 are collectively referred to as antennas 41 in a case where they do not need to be distinguished.

The communication unit 31 sends and receives data. The communication unit 31 includes amplification units 51-1 and 51-2, a wireless interface unit 52-1 and a wireless interface unit 52-2, and signal processing units 53-1 and 53-2. Furthermore, the communication unit 31 includes a data processing unit 54, a communication control unit 55, and a communication storage unit 56.

Note that the amplification units 51-1 and 51-2, the wireless interface units 52-1 and 52-2, and the signal processing units 53-1 and 53-2 are collectively referred to as amplification units 51, wireless interface units 52, and signal processing units 53, respectively, in a case where there is no need to distinguish them.

At a time of sending, the amplification unit 51 amplifies an analog signal supplied from the wireless interface unit 52 to a predetermined power, and outputs the analog signal with amplified power to the antenna 41. At a time of reception, the amplification unit 51 amplifies an analog signal supplied from the antenna 41 to a predetermined power, and outputs the analog signal with amplified power to the wireless interface unit 52.

Part of the function of the amplification unit 51 may be included in the wireless interface unit 52. Furthermore, part of the function of the amplification unit 51 may be a component outside the communication unit 31.

At a time of sending, the wireless interface unit 52 converts a sending symbol stream from the signal processing unit 53 into an analog signal, performs filtering, up-converting to a carrier frequency, and phase control, and outputs the analog signal after the phase control to the amplification unit 51.

At a time of reception, the wireless interface unit 52 performs phase control, down-conversion, and reverse filtering on an analog signal supplied from the amplification unit 51, and outputs a reception symbol stream as a result of conversion into a digital signal, to the signal processing unit 53.

At the time of sending, the signal processing unit 53 performs coding, interleaving, modulation, and the like on a data unit supplied from the data processing unit 54, adds a physical header, and outputs a sending symbol stream to the wireless interface unit 52 thereof.

At the time of reception, the signal processing unit 53 analyzes the physical header of the reception symbol stream supplied from the wireless interface unit 52 thereof, performs demodulation, deinterleaving, decoding, and the like on the reception symbol stream, and generates a data unit. The generated data unit is output to the data processing unit 54.

Note that the signal processing unit 53 performs complex channel characteristic estimation and a spatial separation process as necessary.

The data processing unit 54 includes individual data processing units 61-1 and 61-2 and a common data processing unit 62. In a case where it is not necessary to distinguish the individual data processing units 61-1 and 61-2, they are collectively referred to as individual data processing units 61.

At the time of sending, the individual data processing unit 61 performs a channel access operation based on carrier sensing, addition of a media access control (MAC) header and addition of an error detection code to data to be sent, and multiple concatenation processing of data units.

The individual data processing unit 61 performs a process of decoupling the MAC header of the received data unit, analysis and error detection, and a retransmission requesting operation.

At a time of sending, the common data processing unit 62 performs sequence management of data held in the communication storage unit 56 and control information and management information received from the communication control unit 55. Furthermore, the common data processing unit 62 performs an encryption process of the control information and the management information or the like to generate a data unit, and allocates the generated data unit to the individual data processing units 61-1 and 61-2.

At a time of reception, the common data processing unit 62 performs an analysis process and a reorder process on the data unit.

The antenna 41, the amplification unit 51, the wireless interface unit 52, the signal processing unit 53, and the individual data processing unit 61 having the same branch number form one set (hereinafter also referred to as an individual communication set). Each set becomes a component of the wireless communication device 11, and performs wireless communication on the link thereof. Furthermore, the storage unit 33 may be included in each set.

Note that operations of the individual data processing unit 61 and the common data processing unit 62 are not limited to the operations described above, and for example, one may perform the operation of the other. For example, the individual data processing unit 61 may be defined such that all the functions of the common data processing unit 62 are implemented for each individual communication set.

Furthermore, the link is a wireless transmission path through which data transmission can be performed between two wireless communication devices, and the links that are used by the respective sets may be of different frequency bands. Furthermore, the signal processing unit 53 and the individual data processing unit 61 having the same branch number may be one set, and two sets or three or more sets may be connected to one wireless interface unit 52.

The communication control unit 55 controls operation of each unit in the communication unit 31 and information transmission between the units. Furthermore, the communication control unit 55 performs control to transfer control information and management information notification of which is provided to another wireless communication device to the individual data processing unit 61 and the common data processing unit 62.

The communication control unit 55 includes individual control units 71-1 and 71-2 that control the respective individual communication sets, and a common control unit 72 that performs control common to the common data processing unit 62 and the individual communication sets. In a case where it is not necessary to distinguish the individual control units 71-1 and 71-2, they are collectively referred to as individual control units 71.

In the present technology, the individual control unit 71 conveys to the other individual control unit 71, information indicating the period during which the data unit in its own individual communication set is received or the end of reception of the data unit from the control information (Length, identification information, sequence information, and the like) included in the received data unit. At this time, the information may be conveyed via the common control unit 72.

The communication storage unit 56 holds information to be used by the communication control unit 55. Furthermore, the communication storage unit 56 holds data to be sent and received data.

The control unit 32 includes a central processing unit (CPU), a read only memory (ROM), a random access memory (RAM), and the like. The control unit 32 executes a program stored in the ROM or the like, and controls the communication unit 31 and the communication control unit 55. Furthermore, the control unit 32 may also perform part of the operation of the communication control unit 55. Moreover, the communication control unit 55 and the control unit 32 may be configured as one block.

The storage unit 33 holds information used by the communication unit 31 and the control unit 32. Furthermore, the storage unit 33 may also perform part of the operation of the communication storage unit 56. The storage unit 33 and the communication storage unit 56 may be configured as one block.

Note that the antenna 41, the amplification unit 51, and the wireless interface unit 52 having the same branch number form one set, and without being limited to two sets, three or more sets may be components of the wireless communication device 11. Furthermore, the communication unit 31 is realized by one or more LSIs.

The individual data processing unit 61 is also referred to as a lower MAC. The common data processing unit 62 is also referred to as an Upper MAC or a Higher MAC. Furthermore, a set of the individual data processing unit 61 and the common data processing unit 62 is also referred to as an AP entity or a Non-AP entity. Furthermore, the communication control unit 55 is also referred to as a multi-link device (MLD) management entity.

<Example of Overall Processing Sequence>

Figure 7:
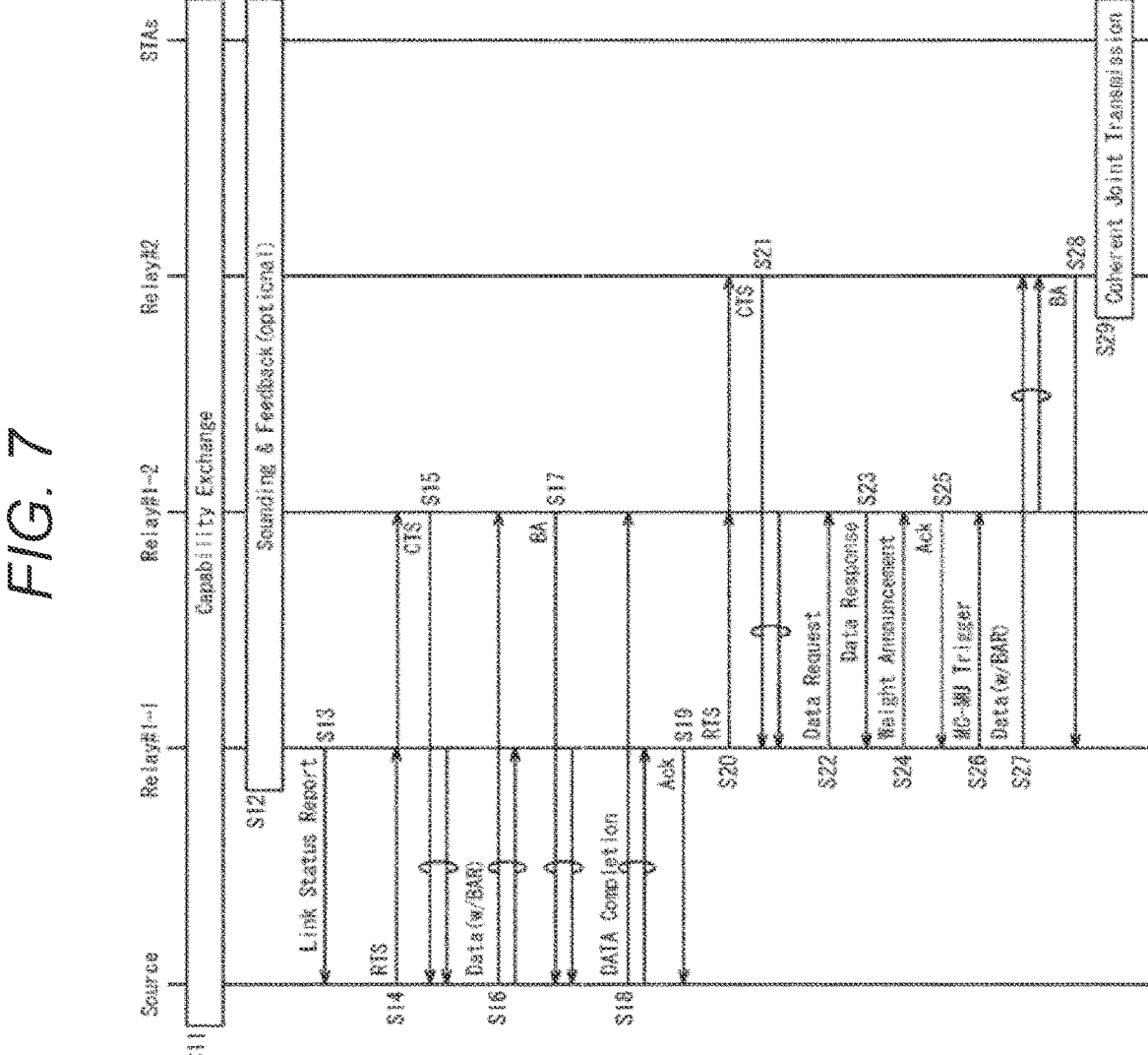
FIG. 7 is a diagram illustrating a sequence for describing overall processing of the wireless communication system in the embodiment of the present technology.

FIG. 7 is a diagram illustrating a sequence for describing overall processing of the wireless communication system in the embodiment of the present technology.

Note that the processing illustrated in FIG. 7 is performed by the first relay station group including the Source, and the two Relays #1-1 and #1-2, the second relay station group including the two Relays #2-1 and #2-2 (collectively referred to as the Relay #2), and STAs. The STAs represent one or more STAs 1 to n. Furthermore, the devices or terminals of the Source, the Relay #1-1, the Relay #1-2, the Relay #2, and the STAs are referred to as devices in a case where there is no need to distinguish them.

In step S11, Capabilities Exchange is performed. That is, the Source, the Relay #1-1, the Relay #1-2, the Relay #2, and the STAs perform Capabilities Exchange for providing notification of information indicating the capability of each device.

In step S12, Sounding & Feedback is performed. That is, the Relay #1-1, the Relay #1-2, the Relay #2, and the STAs send a reference signal for measurement of a propagation channel between the respective devices, and provides notification of the measurement result of the propagation channel for the sent reference signal.

In step S13, the Relay #1-1 sends a frame (hereinafter referred to as a Link Status Report frame) to be communicated as a Link Status Report to the Source. The Relay #1-1 notifies the Source of information generated from the result obtained by Sounding & Feedback in step S12 by sending the Link Status Report frame.

In step S14, the Source sends a Request To Send (RTS) frame. The Source sends an RTS frame to an arbitrary device capable of receiving a frame sent in the present data transmission, thereby providing notification of acquisition of right to send and requesting a specific desired destination device to send a Clear To Send (CTS) frame.

In step S15, in a case where the Relay #1-1 and the Relay #1-2 determine that they are desired destination devices in the previous RTS frame, the Relay #1-1 and the Relay #1-2 send CTS frames. That is, by sending the CTS frames, the Relay #1-1 and the Relay #1-2 notify an arbitrary device capable of receiving the CTS frames of information indicating the right to send (or the period in which the right to send extends) indicated in the RTS frame.

Note that the RTS frame and the CTS frame described above may be realized by the RTS frame and the CTS frame described in Cited Document 3.

In step S16, the Source sends a Data (w/BAR) frame to the first relay station group. In the diagram, w/BAR represents with Block Ack Request (BAR). That is, after a Data frame is sent, the BAR frame that requests sending of a Block Ack (BA) frame is also sent. The BAR frame may be the BAR frame described in Cited Document 3 or may be included in the Data frame. The Relays of the first relay station group receive the Data (w/BAR) frames.

The Relay #1-1 and the Relay #1-2 receive the BAR frames sent from the Source, and send BA frames to the Source in step S17.

In step S18, the Source sends DATA Completion frames to the Relay #1-1 and the Relay #1-2 of the first relay station group. By sending the DATA Completion frames, notification of completion of Data transmission from the Source to the Relays of the first relay station group is provided. The Relay #1-1 and the Relay #1-2 receive the DATA Completion frames sent from the Source.

In step S19, the Relay #1-1 sends an ACK frame to the Source. ACK indicates an acknowledgement of receipt for the most recently received frame. This ACK may also be implemented by the ACK frame or the BA frame described in Cited Document 3. At this time, the Relay #1-2 may also send an ACK frame to the Source.

In step S20, the Relay #1-1 sends an RTS frame similarly to the processing in step S14.

In step S21, similarly to the processing in step S15, the Relay #1-2 and the Relay #2 send CTS frames.

In step S22, the Relay #1-1 sends a Data Request frame to the Relay #1-2. The Data Request frame is a frame notification of which is provided from an arbitrary relay station (in the case of FIG. 7, the Relay #1-1) in the first relay station group to another relay station (in the case of FIG. 7, the Relay #1-2) in the first relay station group in order to request information regarding data that the second relay station group transmits to the STAs by CJT. The Relay #1-2 receives the Data Request frame sent from the Relay #1-1.

In step S23, the Relay #1-2 sends a Data Response frame that is a response to the Data Request to the Relay #1-1.

In step S24, the Relay #1-1 sends a Weight Announcement frame to the Relay #1-2. The Weight Announcement frame is a frame for providing notification of a weight in beamforming performed by Data sending in step S27 described later from an arbitrary relay station (in the case of FIG. 7, the Relay #1-1) in the first relay station group to another relay station (in the case of FIG. 7, the Relay #1-2) in the first relay station group.

In step S25, the Relay #1-2 receives the Weight Announcement frame sent from the Relay #1-1, and sends an ACK frame to the Relay #1-1.

In step S26, the Relay #1-1 sends a multicast multi-user (MC-MU) Trigger frame to the Relay #1-2. The MC-MU Trigger frame is a frame for providing notification of information for prompting sending of Data in step S27.

In step S27, on the basis of the MC-MU Trigger, the Relay #1-2 sends a Data (w/BAR) frame to the Relay #2 that belongs to the second relay station group simultaneously with the Relay #1-1. The Relay #2 receives the BAR frames sent from the Relay #1-1 and the Relay #1-2, and sends a BA frame to the Relay #1-1 in step S28.

In step S29, the Relay #2 sends Coherent Joint Transmission frames to the STAs. By sending the Coherent Joint Transmission frames, data transmission by CJT from any plurality of relay stations of the second relay station group to any STA is performed.

Note that in FIG. 7, the frequency bands used in transmission to be performed may be different. For example, among the Source, the first relay station group, and the second relay station group, transmission may be performed in a first frequency band, and between the second relay station group and the STAs, transmission may be performed in a second frequency band different from the first frequency band.

Each sequence in FIG. 7 may be partially omitted as necessary, and the order may not be as illustrated in the diagram. For example, if it is determined that an Ack is unnecessary in accordance with the type of the data to be transmitted, the Ack may not be present. Furthermore, only one of the Data Completion frame and the Data Request frame may be sent.

Note that, although not illustrated in FIG. 7, the determination timing of routing of the multihop network and notification of the routing may be performed at any timing after Capabilities Exchange.

<Capabilities Exchange>

Figure 8:
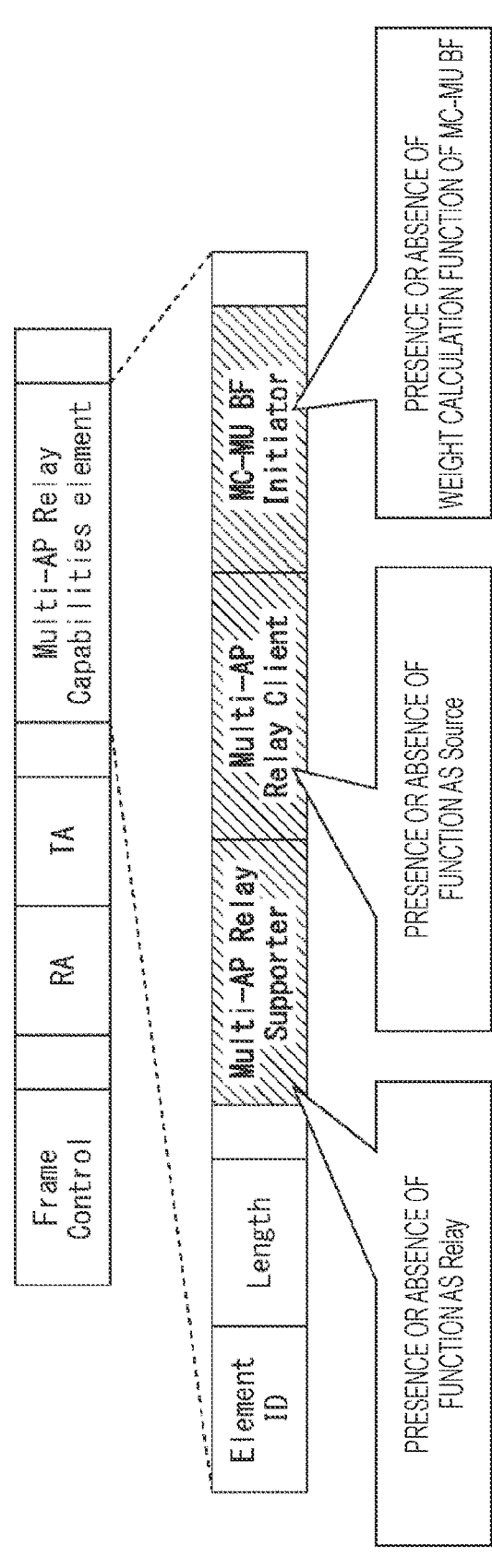
FIG. 8 is a diagram illustrating a configuration example of a frame notification of which is provided in Capabilities Exchange in step S11 of FIG. 7.

FIG. 8 is a diagram illustrating a configuration example of a frame notification of which is provided in Capabilities Exchange in step S11 of FIG. 7.

The frame in FIG. 8 includes Frame Control, a Receiving STA address (RA), a Transmitting STA address (TA), and a Multi-AP Relay Capabilities element. Note that the components are not limited only to these. Furthermore, hatching in FIG. 8 indicates fields including information that is characteristic in the present technology. The same applies to the following diagrams.

The Frame Control includes information indicating that the present frame is a frame notification of which is provided in Capabilities Exchange.

The RA and the TA respectively include information indicating a destination device and a sending source device. For example, a device-specific MAC address may be indicated in the RA and the TA.

The Multi-AP Relay Capabilities element includes information indicating the presence or absence of a function as the Source, the presence or absence of a function as a relay station, and the presence or absence of performance of Weight Announcement or the presence or absence of a weight calculation function with respect to the device itself that sends the present frame.

The Multi-AP Relay Capabilities element includes the following fields: an Element ID, Length, a Multi-AP Relay Supporter, a Multi-AP Relay Client, and an MC-MU Beamforming (BF) Initiator.

The Element ID includes information indicating that the present element is the Multi-AP Relay Capabilities element.

The Length includes information indicating a bit length of the Multi-AP Relay Capabilities element.

The Multi-AP Relay Supporter includes information indicating the presence or absence of a function of a relay station (Relay).

The Multi-AP Relay Client includes information indicating the presence or absence of a function of the Source.

The MC-MU BF Initiator includes information indicating the presence or absence of a function of calculating a weight used when MMUBF is performed.

Note that the MC-MU BF Initiator may include information indicating whether or not Weight Announcement can be performed in a case where MMUBF is performed.

<Configuration of Link Status Report Frame>

Figure 9:
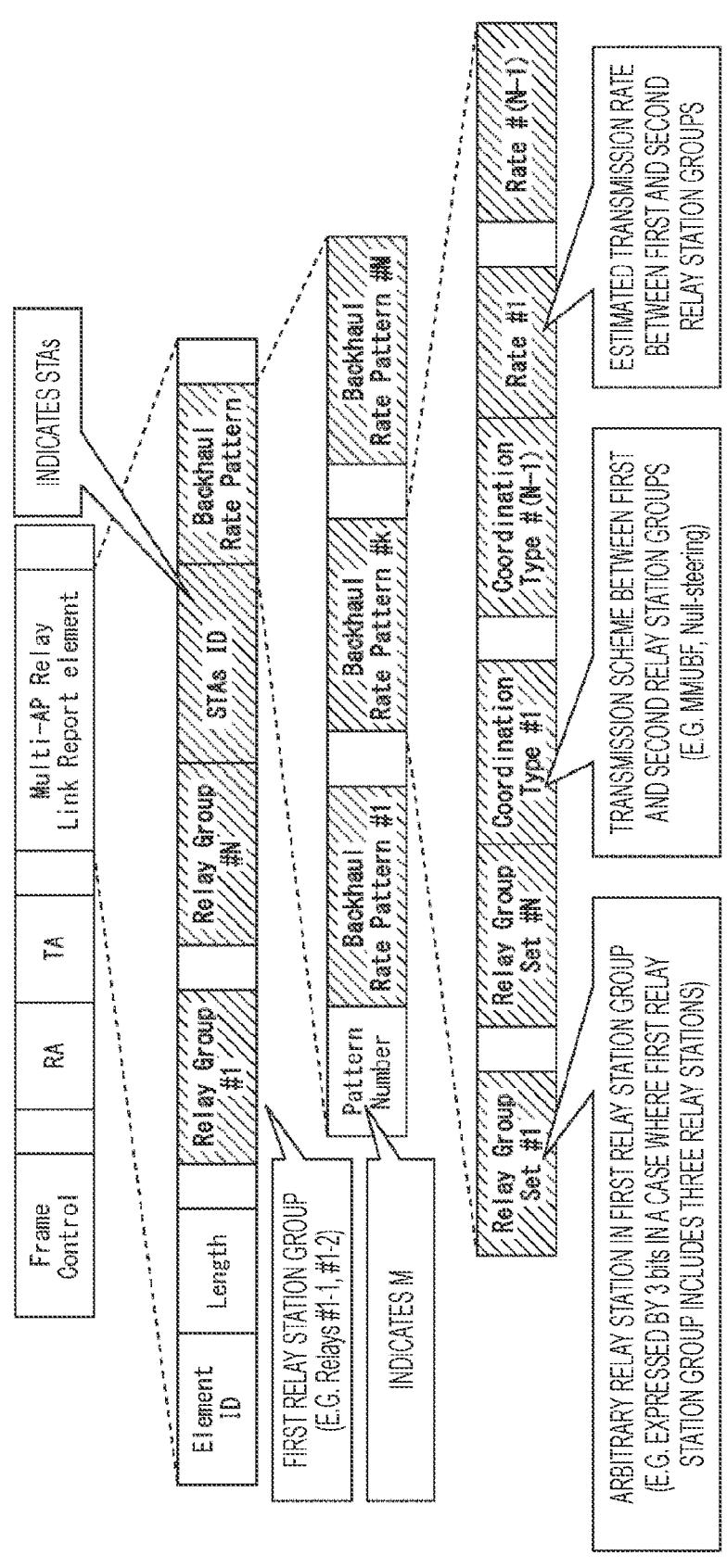
FIG. 9 is a diagram illustrating a configuration example of a Link Status Report frame sent in step S13 of FIG. 7.

FIG. 9 is a diagram illustrating a configuration example of the Link Status Report frame sent in step S13 of FIG. 7.

The Link Status Report frame is a frame for notifying by the Relay #1-1, after the Capabilities Exchange described above has been performed, at least the Source and the Relay #1-1 of data allocated by the Source to the Relay #1-1 and the Relay #1-2 in data transmission and information for determining a frequency or power resource.

The Link Status Report frame in FIG. 9 includes Frame Control, an RA, a TA, and a Multi-AP Relay Link Report element. Note that the components are not limited only to these. Note that hereinafter, i, k, and 1 represent arbitrary integers.

The Frame Control includes information indicating that the present frame is a frame notification of which is provided in the Link Status Report.

The RA and the TA respectively include information indicating a sending source device and a destination device.

The Multi-AP Relay Link Report element includes the following three pieces of information:

(1) information indicating relay stations included in the first relay station group and the second relay station group (2) information indicating STAs that can be destinations in Coherent Joint Transmission in step S29 in FIG. 7

(3) information indicating a communication scheme that can be realized between the first relay station group and the second relay station group and a transmission rate expected in the communication scheme Note that, as will be described later, similar information may be included also in a case where there are third or greater relay station groups.

The Multi-AP Relay Link Report element includes the following fields: an Element ID, Length, Relay Group ID, an STAs ID, and a Backhaul Rate Pattern.

The Element ID includes information indicating that the present element is the Multi-AP Relay Link Report element.

The Length includes information indicating a bit length of the Multi-AP Relay Link Report element.

A Relay Group ID #i includes information indicating Relays included in the ith relay station group. In the case of FIG. 7, a Relay Group ID #1 includes information indicating the Relay #1-1 and the Relay #1-2 included in the first relay station group.

The STAs ID includes information indicating STAs that can be destinations in Coherent Joint Transmission in step S29 in FIG. 7

In the Relay Group and the STAs ID, for example, a device-specific MAC address is indicated.

The Backhaul Rate Pattern includes information regarding a transmission rate that can be achieved among a plurality of relay station groups for each combination of target relay station groups and a transmission scheme.

The Backhaul Rate Pattern includes the following fields: a Pattern Number and a Backhaul Rate Pattern #i.

The Pattern Number includes information indicating the number of subsequent Backhaul Rate Patterns. In the case of FIG. 9, information indicating M is included.

The Backhaul Rate Pattern #i includes information regarding a transmission rate that can be achieved among a plurality of relay station groups for each combination of target relay station groups and a transmission scheme. The information indicated in the present field may be determined by the Relay #1-1 on the basis of a measurement result of the propagation channel obtained by Sounding & Feedback in step 12.

The Backhaul Rate Pattern #i includes a Relay Group Set #i, a Coordination Type #i, and a Rate #i.

The Relay Group Set #i includes information indicating a combination of arbitrary relay station groups in the Relay Group #i.

The Coordination Type #i includes information indicating a transmission scheme used between one or a plurality of relay station groups indicated by the Relay Group Set #i and one or a plurality of relay station groups indicated by a Relay Group Set #(i+1). For example, information indicating a transmission scheme such as MMUBF or Null-Steering described above is included.

The Rate #i includes information indicating an estimated value of the transmission rate that can be achieved by the transmission scheme indicated by the Coordination Type #i between one or a plurality of relay stations indicated by the Relay Group Set #i and one or a plurality of relay stations indicated by the Relay Group Set #(i+1).

Note that, for example, in a case where the ith relay station group includes three Relays, the Relay Group #i may include information indicating all of the respective relay stations included in the ith relay station group, or may include information indicating some of the relay stations.

In a case where the Relay Group #i includes information indicating L relay stations, the Relay Group Set #i in the Backhaul Rate Pattern may be expressed by L bits. For example, it is assumed that four relay stations are sequentially indicated in the Relay Group Set #i, and a Relay #4-1, . . . , and a Relay #4-4 are sequentially indicated. At this time, the kth bit of the Relay Group Set #i may indicate that the kth relay station is selected among the relay stations indicated by the Relay Group #i, and "1011" indicates that the Relay Group #4-1, the Relay Group #4-3, and the Relay Group #4-4 are selected.

The Coordination Type may include, for example, information indicating any of Null Steering, CJT, and Multicast Multi-User Beamforming, or may include information indicating that none of them is used.

The information format of the Rate #i may be changed according to the information indicated by the Coordination Type #i. For example, in a case where Null Steering is indicated in the Coordination Type #i, the following set of information may be included:

information indicating one relay station of the Relay Group Set #i information indicating one relay station of the Relay Group Set #i(i+1)

Information indicating a transmission rate that can be implemented by Null Steering between one relay station of the Relay Group Set #i indicated above and one relay station of the Relay Group Set #(i+1) described above.

For example, in a case where CJT is indicated in the Coordination Type #i, the following set of information may be included:

In a case where the Relay Group Set #i is transmitted to the Relay Group Set #(i+1) by CJT, information indicating the transmission rate expected to be observed at each relay station constituting the Relay Group Set (i+1)

For example, in a case where MC-MU BF is indicated in the Coordination Type #i, the following set of information may be included:

In a case where the Relay Group Set #i is transmitted to the Relay Group Set #(i+1) by MMUBF, information indicating the transmission rate expected to be observed at each relay station constituting the Relay Group Set #(i+1).

<Configuration of Data Frame>

Figure 10:
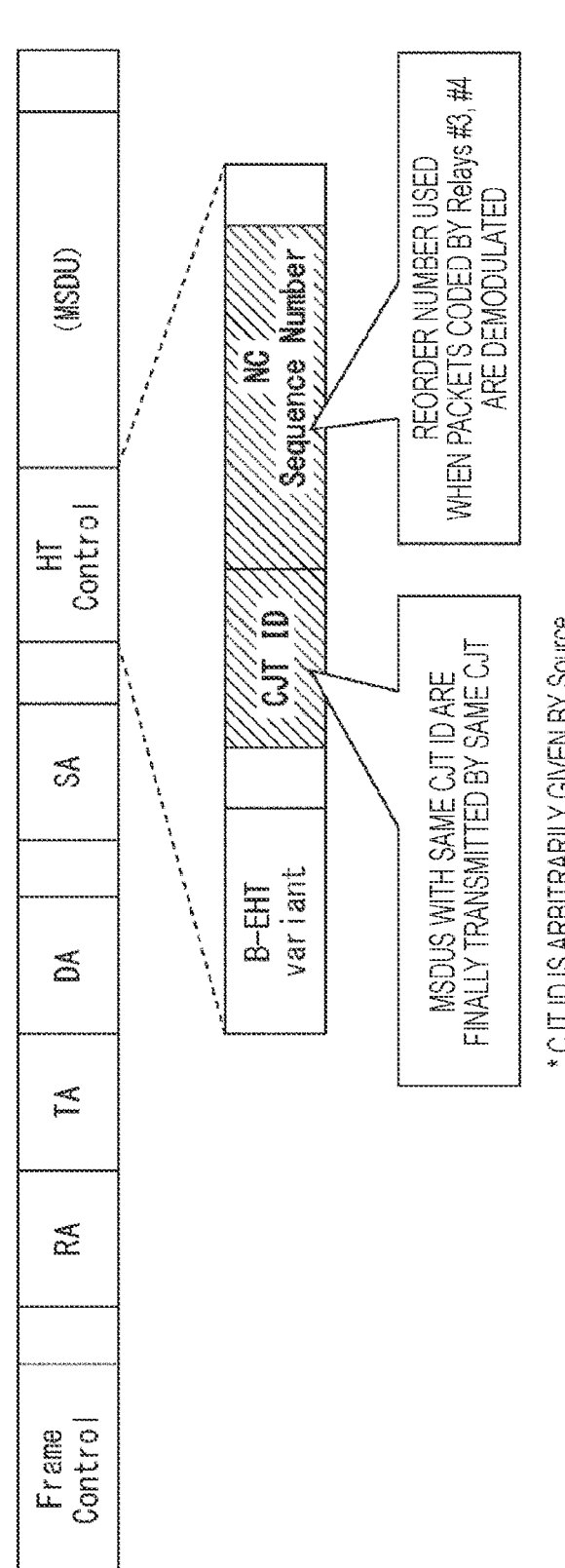
FIG. 10 is a diagram illustrating a configuration example of a Data frame sent in steps S16 and S26 of FIG. 7.

FIG. 10 is a diagram illustrating a configuration example of the Data frame in steps S16 and S27 of FIG. 7.

The Data frame in FIG. 10 includes Frame Control, an RA, a TA, a DA (Destination STA Address), a SA (Source Address), High Throughput (HT) Control, and a Mac Service Data Unit (MSDU). Note that the components are not limited only to these. A plurality of the present frames may be included in a data unit to be transmitted.

The Frame Control includes information indicating that the present frame is transmitted in the Data.

The RA and the TA respectively include information indicating a destination device and a sending source device.

The DA includes information indicating a destination device of the MSDU finally included in the present frame.

The SA includes information indicating the Source.

The HT Control includes an identifier for distinguishing CJT when transmission is finally performed as CJT, and information necessary for decoding processing in a case where a network code is applied.

The MSDU contains data that is finally transmitted as CJT.

The HT Control includes the following subfields: a Beyond-Extremely High Throughput (B-EHT) variant, a CJT ID, and a network coding (NC) Sequence Number.

The B-EHT variant includes information indicating that the HT Control includes information indicating a CJT ID and an NC Sequence Number.

The CJT ID includes information for identifying CJT by which the MSDU included in the present frame is finally transmitted. MSDUs with the same CJT ID are finally transmitted by the same CJT. Note that the CJT ID is arbitrarily generated (given) by the Source.

The network coding (NC) Sequence Number includes information indicating an order necessary for performing reorder when the MSDU in the present frame is coded by a network code (or an erasure code) and the MSDU in the present frame is subjected to network code decoding at a certain relay station. Note that the relay station at which decoding of the network code is performed is not necessarily the relay station to which notification of the present frame is provided. This is because it is sufficient that the network code can be decoded in the Relay #2-1 or the Relay 2-2.

For example, the Relay #2-1 receives network-coded data from the Relay #1-1 and the Relay #1-2 but can decode the network code only after receiving data from both the Relay #1-1 and the Relay #1-2. In contrast, in the case of the Relay #1-1, since data is sent only from the Source, there is a case where data necessary for decoding is not prepared only with received data depending on the network code scheme. However, this is merely a case where there are two relay station groups as illustrated in FIG. 5. For example, in a case where there are three relay station groups, the network code may be decoded only in the third relay station group.

Furthermore, not only one frame but also a plurality of frames may be sent. At this time, the CJT IDs indicated in the respective frames may be different.

Although FIG. 10 illustrates a case where only one CJT ID is stored, it is possible to transmit a plurality of CJT IDs in the following cases.

(1) A plurality of CJT IDs can be received in a case where a plurality of frames is sent.

(2) In the case of transmission to a plurality of devices, different data can be transmitted for each destination device.

In particular, in the case of (1) or the combination of (1) and (2) described above, a plurality of CJT IDs can be transmitted.

<Configuration of Data Completion Frame>

Figure 11:
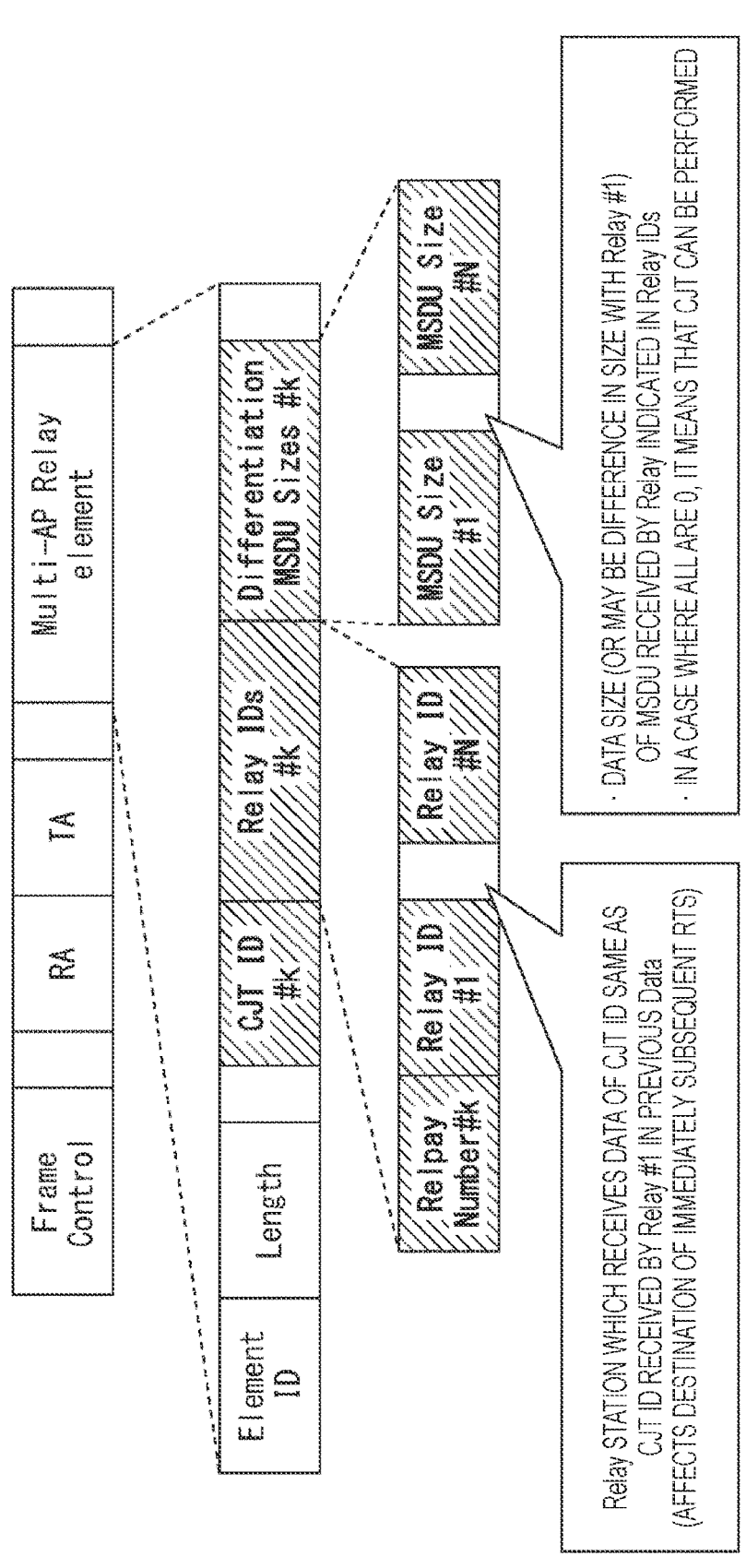
FIG. 11 is a diagram illustrating a configuration example of a DATA Completion frame sent in step S18 of FIG. 7.

FIG. 11 is a diagram illustrating a configuration example of the DATA Completion frame sent in step S18 of FIG. 7.

The DATA Completion frame in FIG. 11 includes Frame Control, an RA, a TA, and a Multi-AP Relay element. Note that the components are not limited only to these.

The Frame Control includes information indicating that the present frame is a frame notification of which is provided in DATA Completion.

The RA and the TA respectively include information indicating a destination device and a sending source device.

The Multi-AP Relay element includes information regarding an MSDU finally transmitted to the STAs by CJT among the MSDUs in one or a plurality of frames transmitted in the previous Data frame.

The Multi-AP Relay element includes the following fields: an Element ID, Length, a CJT ID #k, a Relay ID #k, and a Differentiation MSDU Size #k.

The Element ID includes information indicating that the present element is a Multi-AP Relay element.

The Length includes information indicating a bit length or an octet length of the present element.

The CJT IDs #k includes information indicating the CJT ID corresponding to the CJT ID sent in the previous Data frame and to be indicated by the subsequent Relay IDs and Differentiation MSDU Sizes.

The Relay IDs #k includes information indicating a plurality of relay stations which is the destination of an MSDU associated with the CJT ID indicated by the CJT ID #k, and to which the MSDU has been transmitted in the previous Data frame.

The Differentiation MSDU Size #k includes information indicating an amount of information (or a difference in the amount of information) correctly received among the plurality of relay stations indicated by the Relay ID #k with respect to the MSDU associated with the CJT ID indicated by the CJT ID #k.

The following subfields: a Relay Number #k and a Relay ID #k are included in the Relay IDs #k.

The Relay Number #k includes information indicating the number of Relay IDs #1 to #N included in the same field.

Each of the Relay IDs includes information indicating a plurality of relay stations which is the destination of an MSDU associated with the CJT ID and to which the MSDU has been transmitted in the previous Data frame. Note that the Relay ID is information that affects the destination of the immediately subsequent RTS frame.

The Differentiation MSDU Sizes #k includes as many MSDU Size subfields as the number of the Relay IDs.

An MSDU Size #k includes information indicating an amount of information (or a difference in the amount of information) of the MSDU correctly received by the relay station indicated by the Relay ID #k in the previous Data frame and is associated with the CJT ID indicated by the CJT ID #k. In a case where all of the MSDU Size #k are 0, it means that CJT can be performed.

<Configurations of Data Request frame and Data Response Frame>

Figure 12:
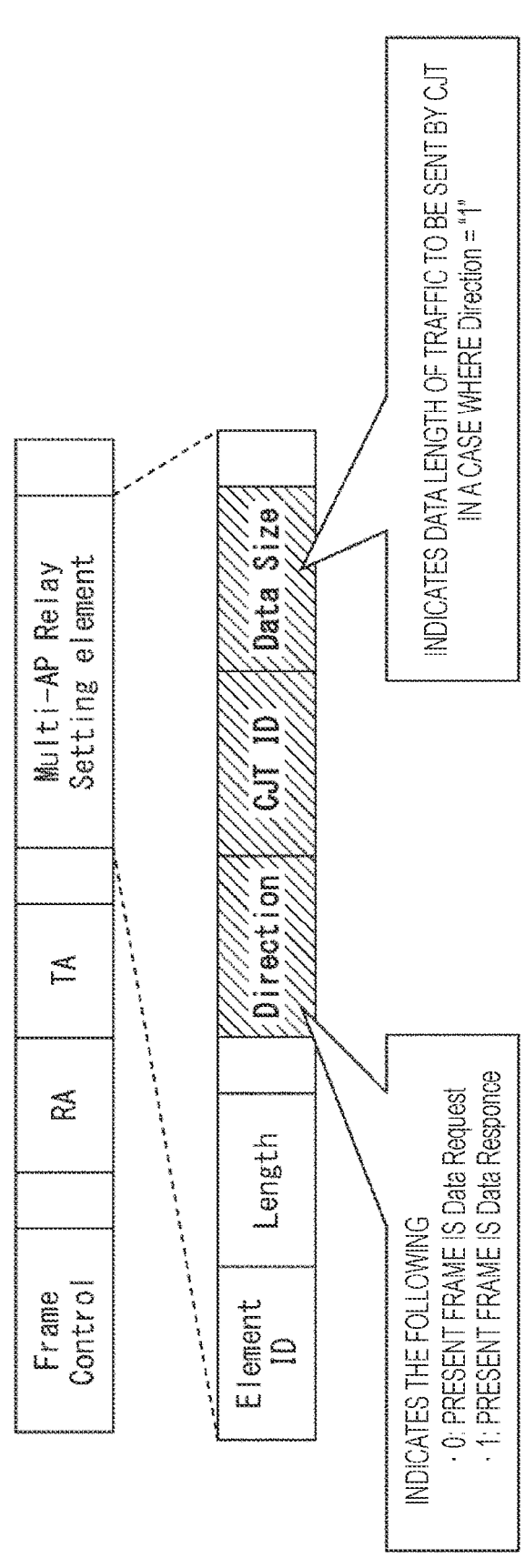
FIG. 12 is a diagram illustrating configuration examples of a Data Request frame and a Data Response frame sent in steps S22 and S23 in FIG. 7.

FIG. 12 is a diagram illustrating configuration examples of the Data Request frame and the Data Response frame sent in steps S22 and S23 in FIG. 7.

The frame in FIG. 12 includes Frame Control, an RA, a TA, and a Multi-AP Relay Setting element. Note that the components are not limited only to these.

The Frame Control includes information indicating that the present frame is a Data Request frame or a Data Response frame.

The RA and the TA respectively include information indicating a destination device and a sending source device.

The Multi-AP Relay Setting element includes information regarding information requested in the Data Request frame or information returned in the Data Response frame.

The Multi-AP Relay Setting element includes the following fields: an Element ID, Length, Direction, a CJT ID, and a Data Size.

The Element ID includes information indicating that the present element is a Multi-AP Relay Setting element.

The Length includes information indicating a bit length or an octet length of the present element.

The Direction includes information for identifying whether the present frame is a Data Request frame or a Data Response frame.

The CJT ID includes information indicating a CJT ID that corresponds to the CJT ID in the frame notification of which is provided from the Source and is a target of subsequent Data Size.

The Data Size includes an amount of information indicating an amount of information of the MSDU associated with the CJT ID indicated in the CJT ID field and held by the device which sends the present frame.

For example, in a case where the Direction is 0, it indicates that the present frame is a Data Request, and in a case where Direction is 1, it indicates that the present frame is a Data Response. In a case where the Direction is 1, the Data Size includes information indicating the data length of traffic to be sent by CJT.

However, in a case where the Direction field includes information indicating that the present frame is a Data Request frame, the Data Size field may not exist. Furthermore, there may be a plurality of CJT ID fields and corresponding Data Size fields.

Note that, if notification of a DATA Completion frame is provided to the relay station that provides notification of the Data Request frame, notification of the Data Request frame and the Data Response frame may be omitted.

Furthermore, similarly to the frame sent in the Data in FIG. 10, not only one frame but also a plurality of frames may be sent. At this time, the CJT IDs indicated in the respective frames may be different.

<Details of Transmission Flow>

Figure 13:
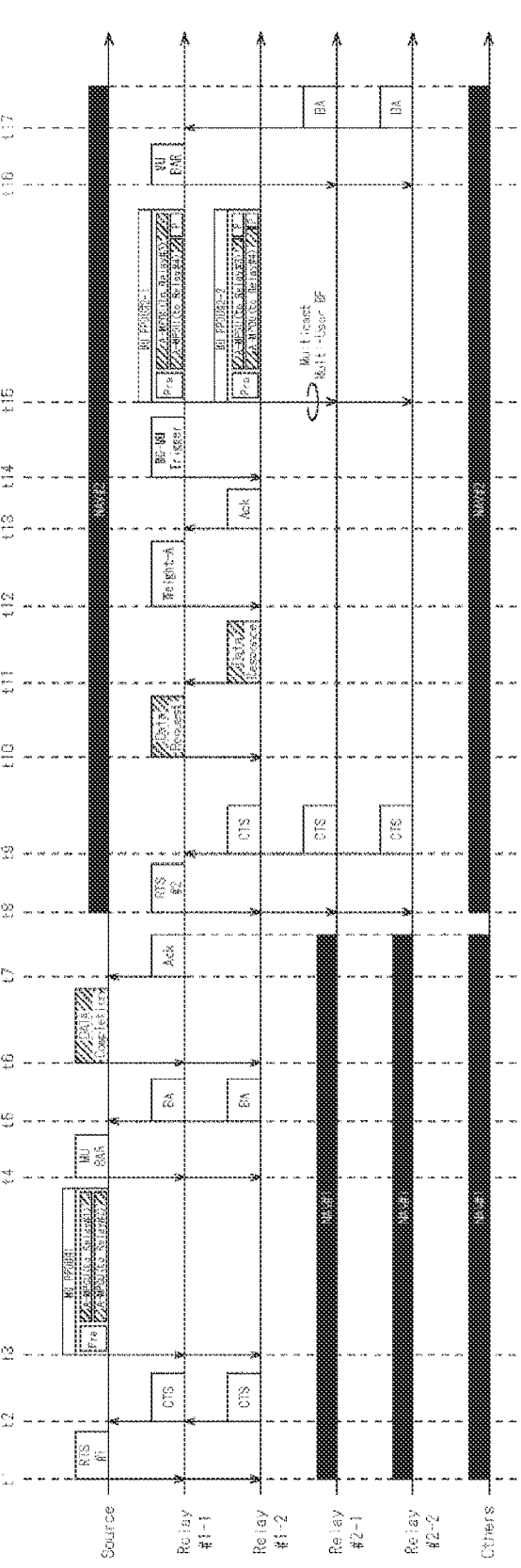
FIG. 13 is a diagram illustrating a time chart of transmission in steps S14 to S28 of FIG. 7.

FIG. 13 is a diagram illustrating a time chart of transmission in steps S14 to S28 of FIG. 7.

FIG. 13 illustrates processing in and after step S14 after the Link Status Report is performed by the Source in step S13 of FIG. 7.

First, at timing t1, the Source notifies the Relay #1-1 and the Relay #1-2 of an RTS frame (RTS #1).

At timing t2, the Relay #1-1 and the Relay #1-2 notifies the Source of a CTS frame. As a result, the Source acquires the right to send.

The devices other than those that have received and demodulated the RTS frame or the CTS frame described above refrain from performing sending at least for the period indicated by the RTS frame or the CTS frame (that is, the period in which the right to send extends). The period during which sending is refrained is defined as a Network Allocation Vector (NAV) in Cited Document 3. In FIG. 13, the period during which sending is refrained is indicated as NAV #1, and the devices other than those are indicated as "Others".

The Source that has acquired the right to send by notification of the RTS frame and the CTS frame performs data transmission to the Relay #1-1 and the Relay #1-2 at timing t3.

FIG. 13 illustrates that a data unit defined as a multi user PHY protocol data unit (MU PPDU) #1 is simultaneously transmitted to the Relay #1-1 and the Relay #1-2. The MU PPDU may be sent as a multi user PHY protocol data unit (MU-PPDU) described in Cited Document 3.

Note that the MU PPDU does not necessarily need to be simultaneously sent to the Relay #1-1 and the Relay #1-2, and may be transmitted in time division or in different frequency bands. For example, transmission to the Relay #1-2 may be performed after transmission to the Relay #1-1, or transmission to the Relay #1-1 and the Relay #1-2 may be performed in different frequency bands, respectively. In this case, the MU PPDU may be sent as a PHY protocol data unit (PPDU) described in Cited Document 3.

Furthermore, at this time, the Relay #1-1 and the Relay #1-2 perform reorder of the MSDU notification of which has been provided and decoding of the erasure code or the network code on the basis of the CJT ID and the NC Sequence Number included in the same frame. Note that the decoding process may be performed by the individual data processing unit 61 or the common data processing unit 62 in the device, and the performance thereof is controlled by the communication control unit 55.

At timing t4, the Source sends an MU BAR to the Relay #1-1 and the Relay #1-2.

In order to issue an acknowledgement of receipt for data transmission, the Source may request an acknowledgement of receipt. In FIG. 13, a multi user block Ack request (MU BAR) is described as a frame for requesting an acknowledgement of receipt from the Relay #1-1 and the Relay #1-2.

This MU BAR may be included in the most recently transmitted data unit.

The Relay #1-1 and the Relay #1-2 that have received notification of requesting an acknowledgement of receipt from the Source send an acknowledgement of receipt to the Source at timing t5. In FIG. 13, BA is defined as a frame for providing notification of an acknowledgement of receipt. This BA may be implemented in the BA frame described in Cited Document 3.

After the acknowledgement of receipt is issued, in a case where it is determined by the Source that necessary information has been correctly received in the Relay #1-1 and the Relay #1-2, the Source provides notification of completion information (DATA Completion) indicating that desired data has been sent to the Relay #1-1 and the Relay #1-2 at timing t6.

As used herein, "necessary information has been correctly received" means that data necessary for correctly demodulating data to be sent as CJT without shortage has been transmitted to the Relay #1-1 and the Relay #1-2. Note that, in practice, data to be finally sent as CJT to the Relay #2-1 and the Relay #2-2 needs to be correctly demodulated in order to perform coherent joint transmission in step S29 in FIG. 7.

For example, in a case where data (or a packet) coded by an erasure code such as a fountain code or a network code is transmitted to the Relay #2-1 and the Relay #2-2 via the Relay #1-1 or the Relay #1-2, due to redundancy thereof, it is not necessary that entirety of the coded data is transmitted to the Relay #2-1 and the Relay #2-2.

Therefore, if it is determined by the Source that data (or a packet) necessary for demodulation has been transmitted to the Relay #1-1 and the Relay #1-2, it may be determined by the Source that transmission has been completed without shortage even if not entirety of the coded data has been transmitted.

After Data Completion is performed, at timing t7, one or a plurality of relay stations in the first relay station group issues an acknowledgement of receipt to the Source. In the case of FIG. 13, an example in which the Relay #1-1 issues an acknowledgement of receipt is illustrated; however, the Relay #1-2 or both the Relay #1-1 and the Relay #1-2 may issue an acknowledgement of receipt.

The criterion for determining the subject that issues an acknowledgement of receipt may be any of the following:

Relay station indicated by the Relay ID #1 in the DATA Completion frame most recently sent Although not illustrated in FIG. 13, in a case where a trigger frame that prompts an acknowledgment of receipt for DATA Completion is sent from the Source, one or a plurality of relay stations that is a destination of the trigger frame Relay station that has sent a Link Status Report frame to the Source After the acknowledgement of receipt has been issued, at timings t8 and t9, any relay station in the first relay station group acquires the right to send by sending an RTS frame and being notified of a CTS frame. FIG. 13 illustrates that the Relay #1-1 notifies the Relay #1-2, the Relay #2-1, and the Relay #2-2 of an RTS frame (RTS #2) at timing t8, and these relay stations return CTS frames at timing t9. Then, at least the devices other than the devices that have received and demodulated the CTS frames returned at timing t9 refrain from sending for the period indicated by the RTS frame and the CTS frame (that is, the period in which the right to send extends). The technique of performing this may be a technique described in Cited Document 3.

FIG. 13 illustrates that a period (NAV #2) in which the devices other than the Relays #1 and the Relays #2 refrain from sending and receiving frames is set.

A rule of determining the relay station that sends an RTS frame may be as follows. In FIG. 13, the Relay #1-1 sends an RTS frame; however, the Relay #1-2 may send an RTS frame.

Among the relay stations that have issued an acknowledgement of receipt for a DATA Completion frame, the relay station that can start sending according to carrier sense multiple access with collision avoidance (CSMA/CA) described in Cited Document 3

In a case where there is an MSDU associated with an arbitrary CJT ID in the MSDU transmitted from the Source, the Relay #1-1 that has obtained the right to send may request notification of the information amount of the MSDU from the relay station that holds the MSDU associated with the CJT ID.

In FIG. 13, at timing t10, the Relay #1-1 notifies the Relay #1-2 of a Data Request frame.

Furthermore, the Relay #1-2 notified of the Data Request frame notifies the Relay #1-1 of a Data Response frame, which is a response to the Data Request frame, at immediately subsequent timing t11.

After notification of the Data Request frame and the Data Response frame is provided, at timing t12, the Relay #1-1 notifies the Relay #1-2 of a weighting factor (Weight-A) necessary for the Relay #1-1 and the Relay #1-2 to perform transmission to the Relay #2-1 and the Relay #2-2.

Note that the processing at timing t12 may be executed after the right to send is acquired by the Relay #1-1 in a case where notification of the Data Request frame and the Data Response frame is omitted.

FIG. 13 illustrates that notification of the weighting factor is provided by the Weight-A frame at timing t12, and in response to this notification, the Relay #1-2 issues an acknowledgement of receipt to the Relay #1-1 at timing t13.

After notification of the weighting factor is completed, at timing t14, the Relay #1-1 notifies the Relay #1-2 of a frame (in the case of FIG. 13, an MC-MU Trigger frame) that prompts the Relay #1-1 and the Relay #1-2 to simultaneously send data to the second relay station group.

The Relay #1-2 notified of the MC-MU Trigger frame transmits data to the second relay station group together with the Relay #1-1 according to the time point indicated in the MC-MU Trigger frame at timing t15. At this time, both the Relay #1-1 and the Relay #1-2 send MSDUs associated with at least one common CJT ID.

FIG. 13 illustrates that sending is performed by Multicast Multi-User BF. The Relay #1-1 sends a multi user (MU)-PPDU #2-1 to the Relay #2-1 and the Relay #2-2, and similarly, the Relay #1-2 sends a MU-PPDU #2-2 to the Relay #2-1 and the Relay #2-2. Here, each sending may be performed by orthogonal frequency division multiple access (OFDMA) or multi-user multiple-input-multiple-output (MU MIMO). Furthermore, the Relay #2-1 and the Relay #2-2 on the reception side separate signals transmitted from the Relay #1-1 and the Relay #1-2 by spatial separation processing or the like, and perform demodulation.

At this time, the lengths of data addressed to the Relay #2-1 and the Relay #2-2 included in the MU-PPDU #2-1 and the MU-PPDU #2-2 are not necessarily the same time length due to the data size and the modulation and coding scheme (MCS). Therefore, all the data lengths may be aligned by padding (P) as illustrated in the MU-PPDU #2-1 and the MU-PPDU #2-2 in FIG. 13. Furthermore, the frame notification of which is provided in the present transmission may be similar to the frame described above with reference to FIG. 10.

Furthermore, at this time, the Relay #2-1 and the Relay #2-2 perform reorder of the MSDU notification of which has been provided and decoding of the erasure code or the network code on the basis of the CJT ID and the NC Sequence Number included in the frame. Note that the decoding process may be performed by the individual data processing unit 61 or the common data processing unit 62 in the device, and the performance thereof is controlled by the communication control unit 55.

At timing t16, the Relay #1-1 sends an MU BAR to the Relay #2-1 and the Relay #2-2. The Relay #2-1 and the Relay #2-2 that have received notification of requesting an acknowledgement of receipt from the Relay #1-1 send an acknowledgement of receipt to the Relay #1-1 at timing t17.

Note that, in FIG. 13, although the Relay #1-1 sends the MU-BAR, the Relay #1-2 may send the MU-BAR. In this case, the Relay #2-1 and the Relay #2-2 that have received notification of requesting an acknowledgement of receipt from the Relay #1-2 send an acknowledgement of receipt to the Relay #1-2.

3. Others

Effects of Present Technology

As described above, in the present technology, a data frame is sent, the data frame including data and identification information for identifying coherent joint transmission (CJT) by which the data is finally transmitted.

Therefore, CJT can be performed in an environment using a plurality of relay stations. Therefore, an end-to-end communication rate and reliability can be improved.

Furthermore, in the present technology, the data frame includes sequence information required for reordering decoding of the data. Moreover, the data is coded data coded by an erasure code or a network code.

Therefore, the data can be decoded. As a result, reliability can be effectively improved.

<Configuration Example of Computer>

The series of processes described above can be executed by hardware or can be executed by software. In a case where the series of processes is executed by software, a program constituting the software is installed from a program recording medium to a computer incorporated in dedicated hardware, a general-purpose personal computer, or the like.

Figure 14:
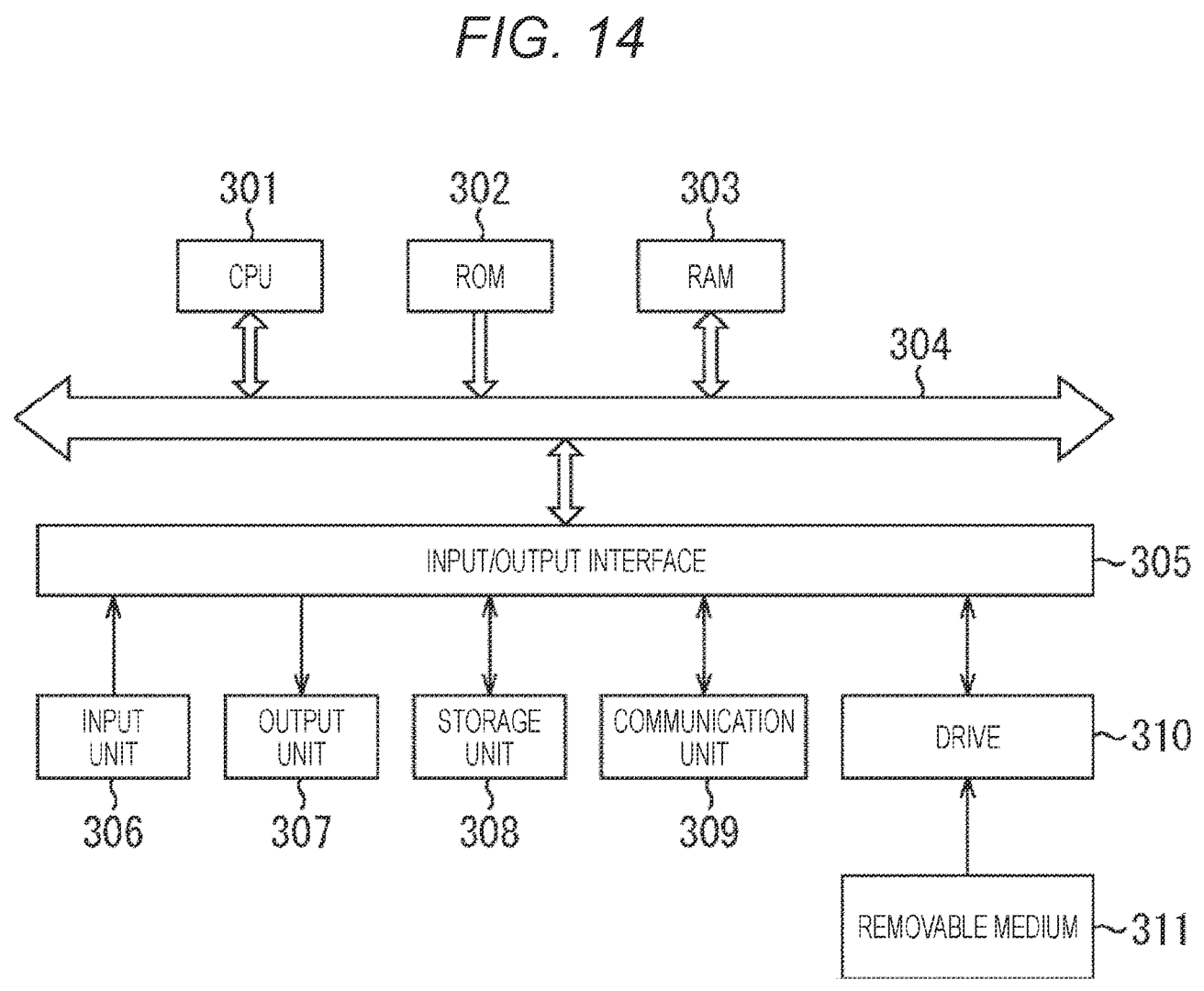

FIG. 14 is a block diagram illustrating an example of a hardware configuration of a computer that executes the series of processes described above according to a program.

A central processing unit (CPU) 301, a read only memory (ROM) 302, and a random access memory (RAM) 303 are mutually connected by a bus 304.

An input/output interface 305 is also connected to the bus 304. An input unit 306 including a keyboard, a mouse, and the like, and an output unit 307 including a display, a speaker, and the like are connected to the input/output interface 305. Furthermore, a storage unit 308 including a hard disk, a nonvolatile memory, or the like, a communication unit 309 including a network interface or the like, and a drive 310 that drives a removable medium 311 are connected to the input/output interface 305.

In the computer configured as described above, for example, the CPU 301 loads the program stored in the storage unit 308 into the RAM 303 via the input/output interface 305 and the bus 304 and executes the program, and thus the series of processes described above is performed.

The program to be executed by the CPU 301 is provided, for example, by being recorded on the removable medium 311 or via a wired or wireless transmission medium such as a local area network, the Internet, or digital broadcasting, and is installed in the storage unit 308.

Note that the program executed by the computer may be a program that performs processes in time series in the order described in the present Description, or a program that performs processes in parallel or at a necessary timing such as when a call is made.

Note that in the present Description, a system means a set of a plurality of components (devices, modules (parts), and the like), and it does not matter whether or not all the components are in the same housing. Therefore, a plurality of devices housed in separate housings and connected via a network and one device in which a plurality of modules is housed in one housing are both systems.

Furthermore, the effects described in the present Description are merely examples and are not limited, and other effects may also be present.

Embodiments of the present technology are not limited to the embodiment described above, and various modifications can be made without departing from the gist of the present technology.

For example, the present technology may be configured as cloud computing in which one function is shared by a plurality of devices through a network for processing in cooperation.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

<Combination Examples of Configurations>

The present technology can also have the following configurations.

(1)

A wireless communication device including: a communication control unit that causes a data frame to be sent, the data frame including data and identification information for identifying coherent joint transmission (CJT) by which the data is finally transmitted.

(2)

The wireless communication device according to (1) above, in which the data frame includes sequence information necessary for decoding the data.

(3)

The wireless communication device according to (1) or (2) above, in which the data is coded data coded by an erasure code or a network code.

(4)

The wireless communication device according to any one of (1) to (3) above, in which the data is sent by a multicast multi-user beamforming (MMUBF) scheme.

(5)

The wireless communication device according to any one of (1) to (4) above, in which the communication control unit causes capability information including information regarding presence or absence of a function of a source station that provides the data, presence or absence of a function of a relay station that relays the data, and a weight of the MMUBF to be exchanged with a device existing in a network to which the wireless communication device belongs.

(6)

The wireless communication device according to any one of (1) to (5) above, in which the communication control unit sends a completion notification frame indicating that the data has been sent to another wireless communication device that is a destination of the data.

(7)

The wireless communication device according to (6) above, in which the completion notification frame includes the identification information, information regarding a data amount of the data associated with the identification information, and information regarding a plurality of wireless communication devices that is a destination of the data associated with the identification information.

(8)

The wireless communication device according to any one of (1) to (5) above, further including a reception unit that receives the data frame sent from another first wireless communication device, in which the communication control unit causes the data frame to be sent to another second wireless communication device.

(9)

The wireless communication device according to (8) above, in which in a case where the another second wireless communication device performs the CJT, the communication control unit causes the data frame to be sent to the another second wireless communication device at same timing as another third wireless communication device that receives the data frame same as the data frame sent from the another first wireless communication device to the wireless communication device.

(10)

The wireless communication device according to (9) above, in which the data frame sent to the another second wireless communication device includes padding.

(11)

The wireless communication device according to any one of (8) to (10) above, in which the communication control unit causes a request frame including the identification information and a request for information regarding the data associated with the identification information to be sent to another third wireless communication device that receives the data frame same as the data frame sent to the wireless communication device from the another first wireless communication device.

(12)

The wireless communication device according to any one of (8) to (10) above, in which the reception unit receives a request frame including the identification information and a request for information regarding the data associated with the identification information from another third wireless communication device that receives the data frame same as the data frame sent to the wireless communication device from the another first wireless communication device, and the communication control unit causes a response frame including the identification information and the information regarding the data to be sent to the another third wireless communication device in response to the request frame.

(13)

The wireless communication device according to any one of (8) to (12) above, in which the communication control unit causes status information to be sent to the another first wireless communication device, the status information including information indicating a terminal to be a destination of the CJT, information indicating a relay station group to which a relay station that relays the data belongs, and information regarding a transmission rate achievable in a plurality of the relay station groups for each combination of the relay station group and a transmission scheme.

(14)

The wireless communication device according to (8) above, in which in a case where sending can be started along carrier sense multiple access with collision avoidance (CSMA/CA) after a completion notification frame indicating that the data has been sent is received, the communication control unit causes an RTS frame to be sent, and the reception unit receives a CTS frame corresponding to the RTS frame.

(15)

A wireless communication method in which a wireless communication device includes a communication control unit that causes a data frame to be sent, the data frame including data and identification information for identifying coherent joint transmission (CJT) by which the data is finally transmitted.

(16)

A wireless communication device including:

a reception unit that receives a data frame including data and identification information for identifying coherent joint transmission (CJT) by which the data is finally sent; and

24 a decoding unit that decodes the data on the basis of the identification information.

(17)

The wireless communication device according to (16) above, in which the data frame includes sequence information necessary for decoding the data, and the decoding unit decodes the data on the basis of the identification information and the sequence information.

(18)

The wireless communication device according to (16) or (17) above, in which the data is coded data coded by an erasure code or a network code.

(19)

The wireless communication device according to any one of (16) to (18) above, in which the data is sent by a multicast multi-user beamforming (MMUBF) scheme.

(20)

A wireless communication method including:

by a wireless communication device, receiving a frame including data and identification information for identifying coherent joint transmission (CJT) by which the data is finally sent; and by the wireless communication device, decoding the data on the basis of the identification information.

REFERENCE SIGNS LIST

11 Wireless communication device
31 Communication unit
54 Data processing unit
55 Communication control unit
54 Communication storage unit
61, 61-1, 61-2 Individual data processing unit
62 Common data processing unit
71, 71-1, 71-2 Individual control unit
72 Common control unit

The invention claimed is:

1. A first wireless communication device, comprising:

a first processor configured to transmit a data frame to a second specific wireless communication device via a first specific wireless communication device, wherein the data frame includes data and identification information for identification of coherent joint transmission (CJT) based on which the data is transmitted; and a second processor configured to receive the data frame sent from the first specific wireless communication device, wherein the first processor is further configured to transmit status information to the first specific wireless communication device, and the status information includes:

information indicating a terminal to be a destination of the CJT, information indicating a relay station group of a plurality of relay station groups to which a relay station that relays the data belongs, and information regarding a transmission rate achievable in the plurality of relay station groups for each combination of the relay station group and a transmission scheme.

2. The first wireless communication device according to claim 1, wherein the data frame includes sequence information to reorder a decoding process of the data.

3. The first wireless communication device according to claim 2, wherein the data is coded data coded by one of an erasure code or a network code.

4. The first wireless communication device according to claim 3, wherein the transmission of the data is by a multicast multi-user beamforming (MMUBF) scheme.

5. The first wireless communication device according to claim 4, wherein the first processor is further configured to exchange capability information with a device that exists in a network to which the first wireless communication device belongs, and the capability information includes:

information regarding one of presence or absence of a function of a source station that provides the data, information regarding one of presence or absence of a function of the relay station that relays the data, and information regarding a weight of the MMUBF.

6. The first wireless communication device according to claim 1, wherein the first processor is further configured to transmit a completion notification frame indicating that the data has been sent to a second wireless communication device that is a destination of the data.

7. The first wireless communication device according to claim 6, wherein the completion notification frame includes the identification information, information regarding a data amount of the data associated with the identification information, and information regarding a plurality of wireless communication devices that is the destination of the data associated with the identification information.

8. The first wireless communication device according to claim 1, wherein in a case where the second specific wireless communication device executes the CJT, the first processor is further configured to transmit the data frame to the second specific wireless communication device at same timing as a third specific wireless communication device, and the third specific wireless communication device receives the data frame same as the data frame sent from the first specific wireless communication device to the first wireless communication device.

9. The first wireless communication device according to claim 8, wherein the data frame sent to the second specific wireless communication device includes padding.

10. The first wireless communication device according to claim 1, wherein the first processor is further configured to:

transmit a request frame including the identification information; and transmit a request for information regarding the data associated with the identification information to a another third specific wireless communication device that receives the data frame same as the data frame sent to the first wireless communication device from the first specific wireless communication device.

11. The first wireless communication device according to claim 1, wherein the second processor is further configured to receive a request frame including the identification information and a request for information regarding the data associated with the identification information from a third specific wireless communication device that receives the data frame same as the data frame sent to the first wireless communication device from the first specific wireless communication device, and the first processor is further configured to transmit, based on the request frame, a response frame including the identification information and the information regarding the data to the third specific wireless communication device.

12. The first wireless communication device according to claim 1, wherein in a case where transmission is started along carrier sense multiple access with collision avoidance (CSMA/CA) after reception of a completion notification frame that indicates that the data is transmitted, the first processor is further configured to transmit an RTS frame, and the second processor is further configured to receive a CTS frame corresponding to the RTS frame.

13. A wireless communication method, comprising:

transmitting, by a first processor, a data frame to a second specific wireless communication device via a first specific wireless communication device, wherein the data frame includes data and identification information for identification of coherent joint transmission (CJT) based on which the data is finally transmitted;

receiving, by a second processor, the data frame sent from the first specific wireless communication device; and transmitting, by the first processor, status information to the first specific wireless communication device, wherein the status information includes:

information indicating a terminal to be a destination of the CJT, information indicating a relay station group of a plurality of relay station groups to which a relay station that relays the data belongs, and information regarding a transmission rate achievable in the plurality of relay station groups for each combination of the relay station group and a transmission scheme.

14. A first wireless communication device, comprising:

a processor configured to:

receive a data frame including data and identification information for identification of coherent joint transmission (CJT) based on which the data is transmitted;

decode the data based on the identification information, wherein the data is transmitted by a multicast multiuser beamforming (MMUBF) scheme; and exchange capability information with a second wireless communication device, wherein the second wireless communication device exists in a network to which the first wireless communication device belongs, and the capability information includes:

information regarding one of presence or absence of a function of a source station that provides the data, information regarding one of presence or absence of a function of a relay station that relays the data, and information regarding a weight of the MMUBF.

15. The first wireless communication device according to claim 14, wherein the data frame includes sequence information to reorder the decoded data, and the processor is further configured to decode the data based on a basis of the identification information and the sequence information.

16. The first wireless communication device according to claim 15, wherein the data is coded data coded by one of an erasure code or a network code.

17. A wireless communication method of a first wireless communication device, comprising:

receiving, by a processor, a data frame including data and identification information for identifying coherent joint transmission (CJT) based on which the data is transmitted;

decoding, by the processor, the data based on the identification information, wherein the data is transmitted by a multicast multi-user beamforming (MMUBF) scheme; and exchanging, by the processor, capability information with a second wireless communication device, wherein the second wireless communication device exists in a network to which the first wireless communication device belongs, and the capability information includes:

information regarding one of presence or absence of a function of a source station that provides the data, information regarding one of presence or absence of a function of a relay station that relays the data, and information regarding a weight of the MMUBF.

\*    \*    \*    \*    \*